(12) United States Patent
Raundahl Gregersen et al.

(10) Patent No.: US 8,707,287 B2
(45) Date of Patent: Apr. 22, 2014

(54) METHOD, COMPUTER PROGRAM PRODUCT, AND SYSTEM FOR NON-BLOCKING DYNAMIC UPDATE OF STATICALLY TYPED CLASS-BASED OBJECT-ORIENTED SOFTWARE

(75) Inventors: Allan Raundahl Gregersen, Odense SO (DK); Michael Rasmussen, Odense M (DK); Bo Norregaard Jorgensen, Odense M (DK)

(73) Assignee: Syddansk Universitet, Odense M (DK)

( * ) Notice: Subject to any disclaimer, the term of this patent is extended or adjusted under 35 U.S.C. 154(b) by 428 days.

(21) Appl. No.: 13/130,524

(22) PCT Filed: Nov. 16, 2010

(86) PCT No.: PCT/EP2010/067612
§ 371 (c)(1),
(2), (4) Date: Aug. 3, 2011

(87) PCT Pub. No.: WO2011/072970
PCT Pub. Date: Jun. 23, 2011

(65) Prior Publication Data
US 2011/0283256 A1 Nov. 17, 2011

Related U.S. Application Data

(60) Provisional application No. 61/287,750, filed on Dec. 18, 2009.

(51) Int. Cl.
*G06F 9/44* (2006.01)
(52) U.S. Cl.
USPC .......................... 717/168; 717/108; 717/170

(58) Field of Classification Search
CPC ................ G06F 8/65; G06F 8/67; G06F 8/30
USPC .......................................... 717/108, 168, 170
See application file for complete search history.

(56) References Cited

U.S. PATENT DOCUMENTS

| 6,629,315 | B1 | 9/2003 | Naylor |
| 7,530,077 | B2 | 5/2009 | Bhogal et al. |
| 2012/0254848 | A1* | 10/2012 | Robertson et al. ............ 717/166 |

OTHER PUBLICATIONS

Bialek, R., et al., "Partitioning of Java Applications to Support Dynamic Updates," Proceedings of the 11th Asia-Pacific Software Engineering Conference, 2004, pp. 616-623.

(Continued)

*Primary Examiner* — Anna Deng
(74) *Attorney, Agent, or Firm* — Houston & Associates, LLP

(57) ABSTRACT

A method, computer program product, and system for non-blocking dynamic update of statically-typed class-based object-oriented software executing as byte-code on a virtual machine within an actively running computer system is provided. A set of objects instantiated from an existing module or multiple modules (identifiable collections of application resources and class definitions in the form of byte-code representations) is ready for execution on a virtual machine in an actively running computer system. New versions of one or more modules corresponding to those already loaded into the actively running virtual machine are dynamically loaded into the virtual machine for the purpose of updating the running software. The class definitions within the loaded modules are prepared for dynamic update by inserting byte-code that enables; transparent state transfer and shared object identity between objects of a former version and the new version of a class.

37 Claims, 39 Drawing Sheets

(56) References Cited

OTHER PUBLICATIONS

Büchi, M., et al., "Generic Wrappers," Proceedings of the 14th European Conference on Object-Oriented programming, Lecture Notes in Computer Science, vol. 1850, Springer-Verlag, 2000, pp. 201-225.
Chen, H., et al., "POLUS: A POwerful Live Updating System," Proceedings of the 29th International Conference on Software Engineering, IEEE Computer Society, 2007, pp. 271-281.
Dmitriev, M., "Safe Class and Data Evolution in Large and Long-Lived Java Applications," PhD thesis, Department of Computing Science, University of Glasgow, Scotland, 2001, 194 pages.
Drossopoulou, S., et al., "What is Java Binary Compatibility?." Proceedings of the 13th ACM SIGPLAN Conference on Object-Oriented Programming, Systems, Languages, and Applications, 1998, pp. 341-361.
Gustavsson, J., "Dynamic Updating of Computer Programs—Proposed Improvements to the JDrums Updating System," Rise Publications, 2005, 6 pages.
Hjálmtýsson, G., et al., "Dynamic C++ Classes," Proceedings of the USENIX 1998 Annual Technical Conference, USENIX Association, pp. 65-76.
Malabarba, S., et al., "Runtime Support for Type-Safe Dynamic Java Classes," Proceedings of the 14th European Conference on Object-Oriented Programming, Lecture Notes in Computer Science, vol. 1850, Springer-Verlag, 2000, pp. 337-361.
Orso, A., et al., "A Technique for Dynamic Updating of Java Software," Proceedings of the International Conference on Software Maintenance, IEEE Computer Society, 2002, pp. 649-658.
Sato, Y., et al., "Loosely-separated 'Sister' Namespaces in Java," Proceedings of the 19th European Conference on Object-Oriented Programming, Lecture Notes in Computer Science, vol. 3586, Springer-Verlag, 2005, pp. 49-70.
Stanek, J., et al., "Online Software Maintenance for Mission-Critical Systems," Proceedings of the 22nd International Conference on Software Maintenance, IEEE Computer Society, 2006, pp. 93-103.
Subramanian, S., et al., "Dynamic Software Updates: A VM-centric Approach," Proceedings of the 2009 ACM SIGPLAN conference on Programming language design and implementation, ACM SIGPLAN Notices, vol. 44, No. 6, 2009, pp. 1-12.
International Preliminary Report on Patentability issued Jun. 19, 2012 for International Application No. PCT/EP2010/067612, filed Nov. 16, 2010.
Raundahl Gregersen et al., "Towards a dynamic-update-enabled JVM," *Proceedings of the Workshop on AOP and Meta-Data for Software Evolution* (Jul. 6, 2009): 1-7. XP002631459.
Raundahl Gregersen et al., "Module reload through dynamic update—The case of NetBeans," *Software and Maintenance and Reengineering, 2008. CSMR 2008. 12th* European Conference on, IEEE, Piscataway, NJ, USA (Apr. 1, 2008); 23-32. XP031244865.
Liang et al., "Dynamic class loading in the java virtual machine," *ACM Sigplan Notices, ACM, Association for Computing Machinery* New York, NY, US, vol. 33, No. 10 (Oct. 1, 1998): 36-44. XP000831202.
International Search Report (Form PCT/ISA/210) for corresponding International Application No. PCT/EP2010/067612 mailed Apr. 19, 2011.
Written Opinion (Form PCT/ISA/237) for corresponding International Application No. PCT/EP2010/067612.

\* cited by examiner

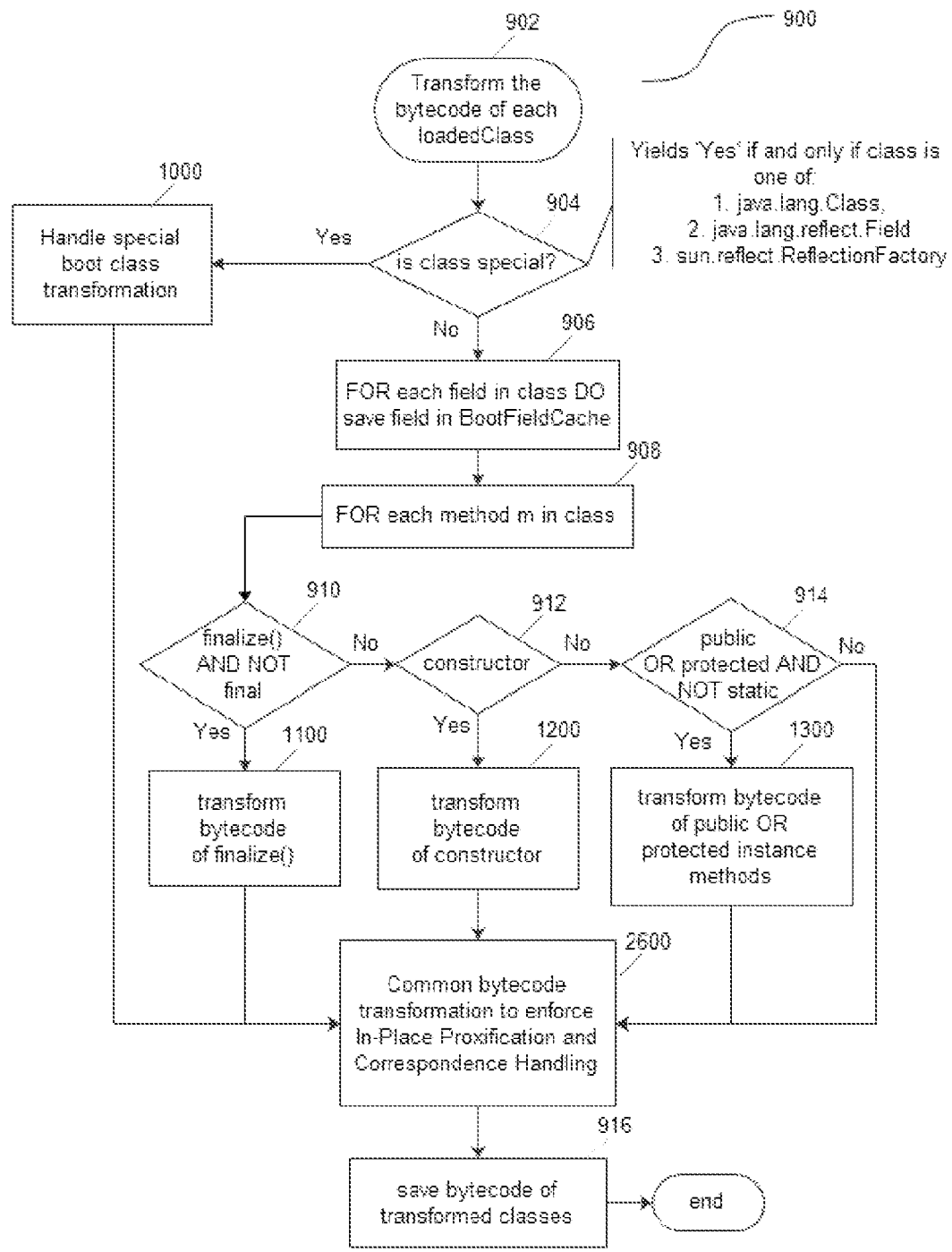
Fig. 9.1

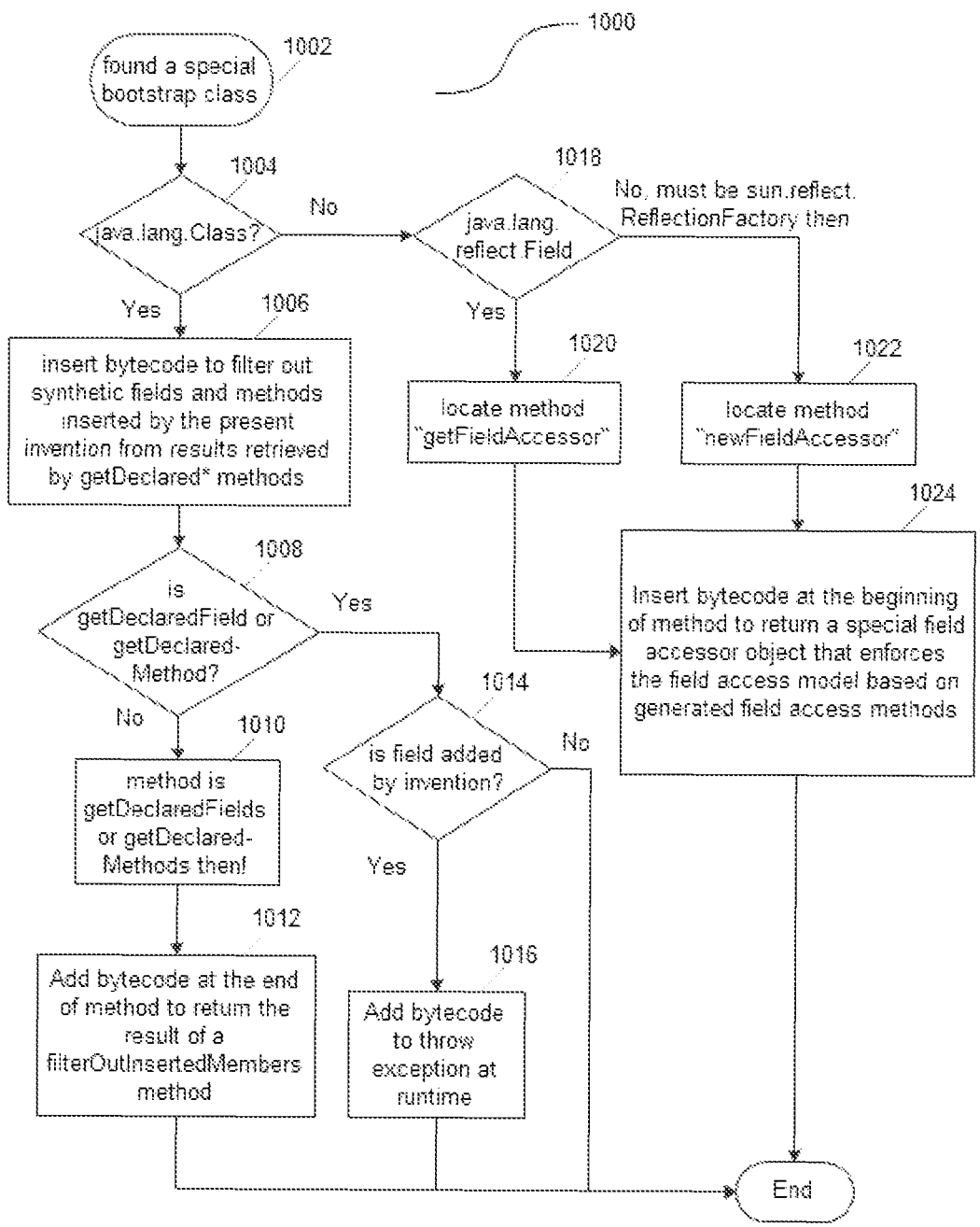
Fig. 9.2

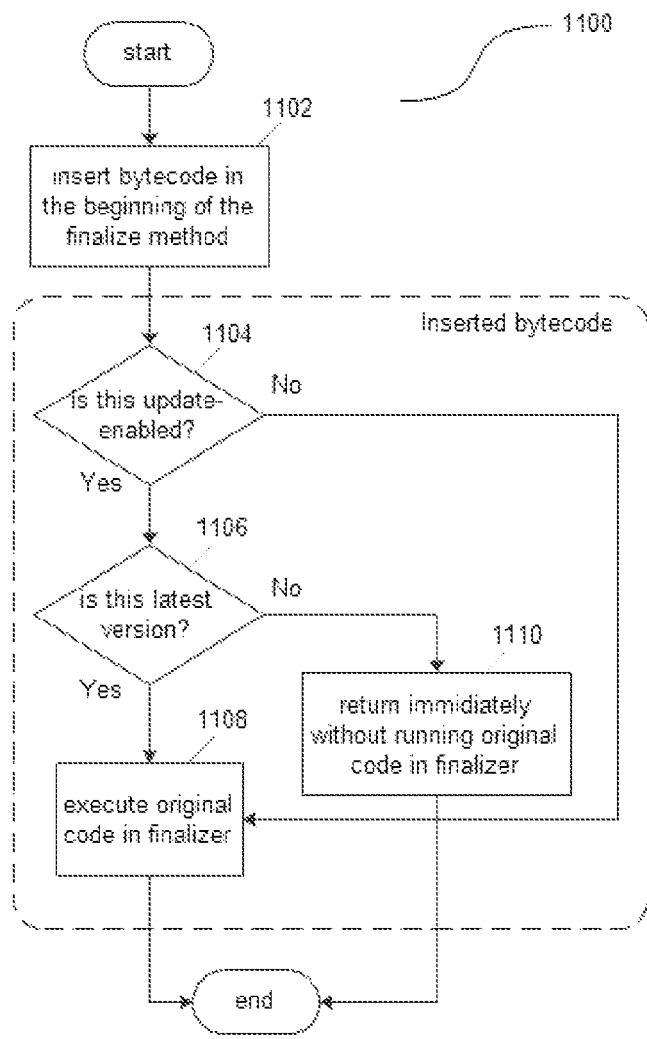
Fig. 9.3

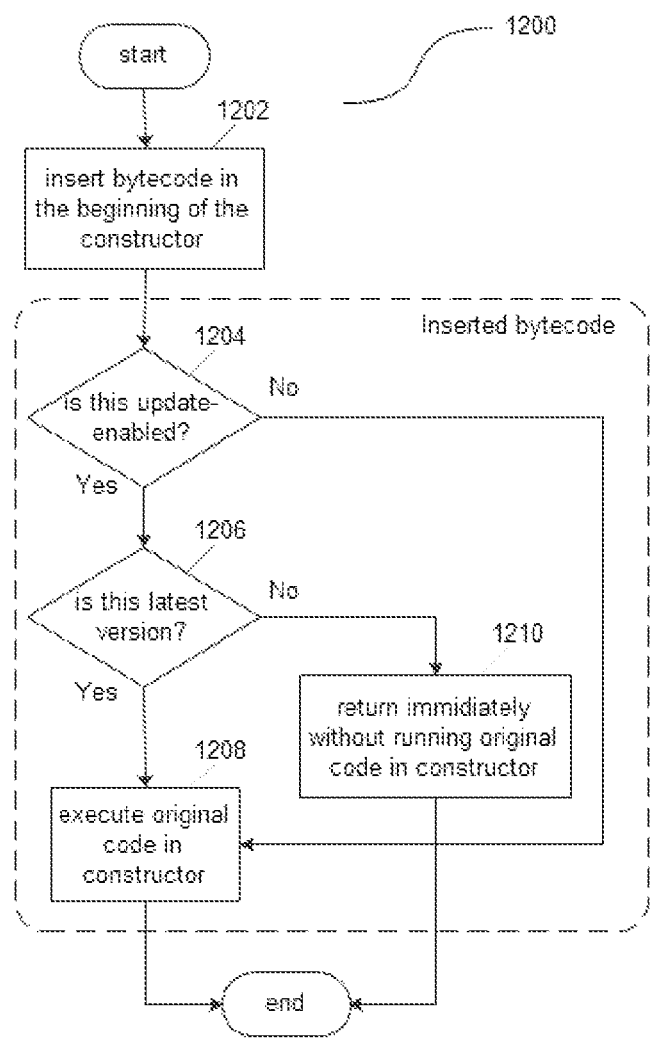
Fig. 9.4

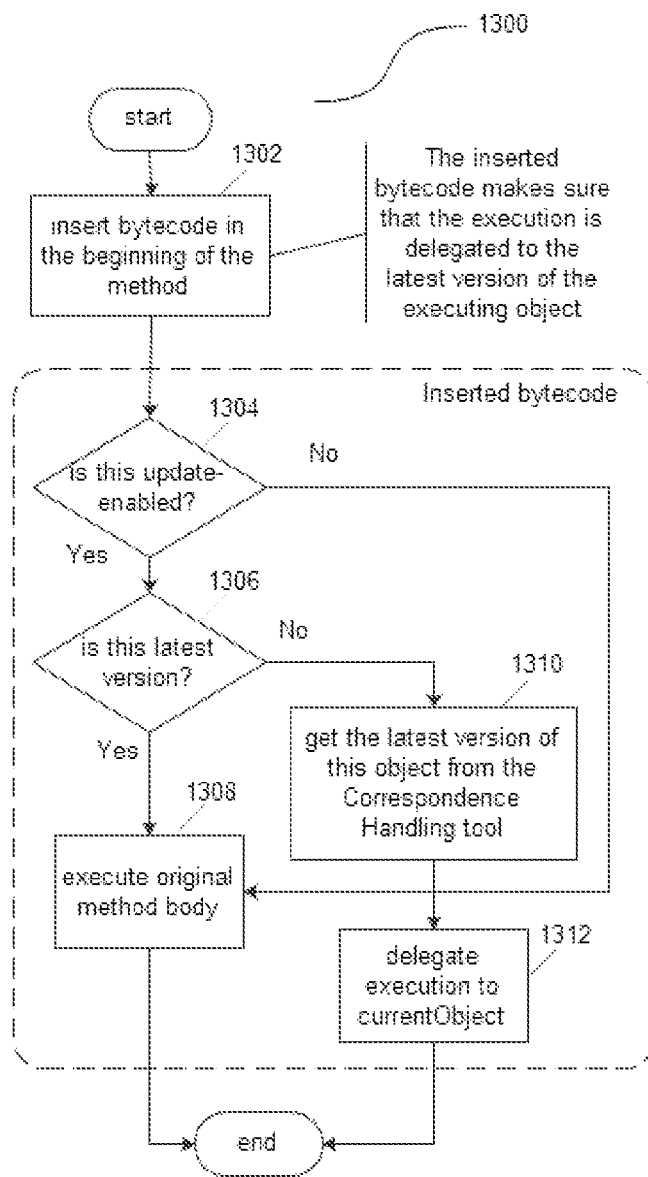
Fig. 9.5

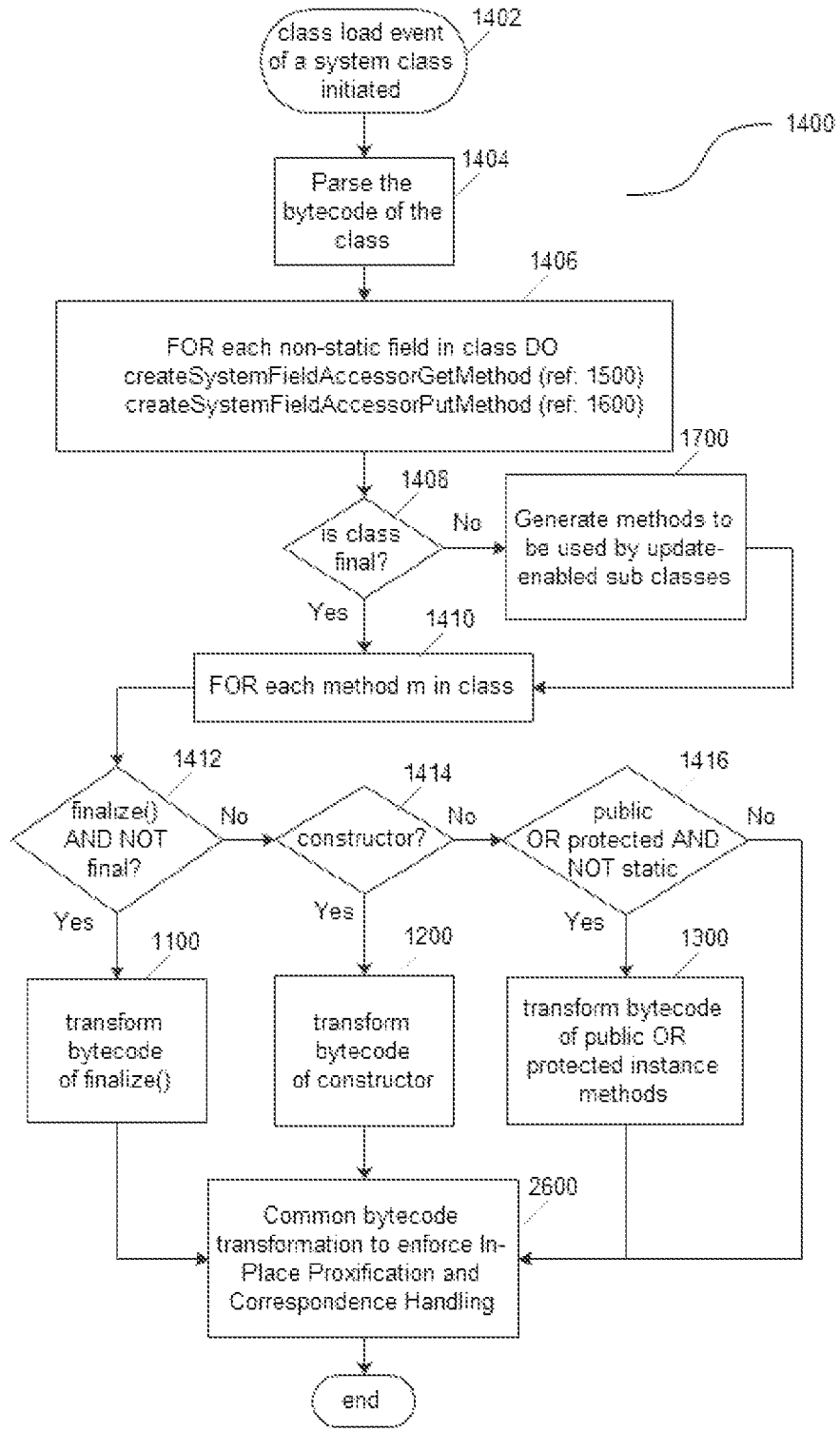
Fig. 9.6

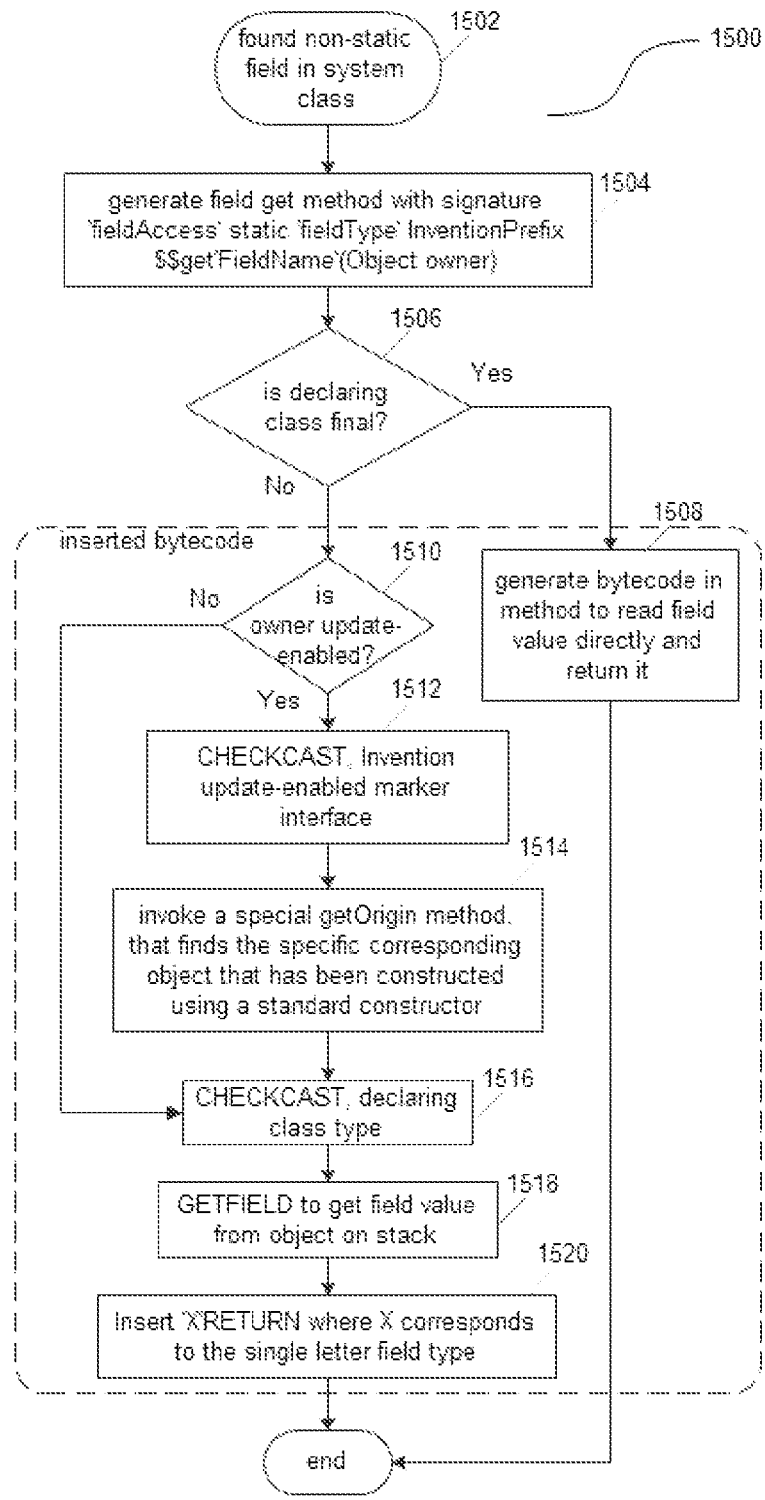
Fig. 9.7

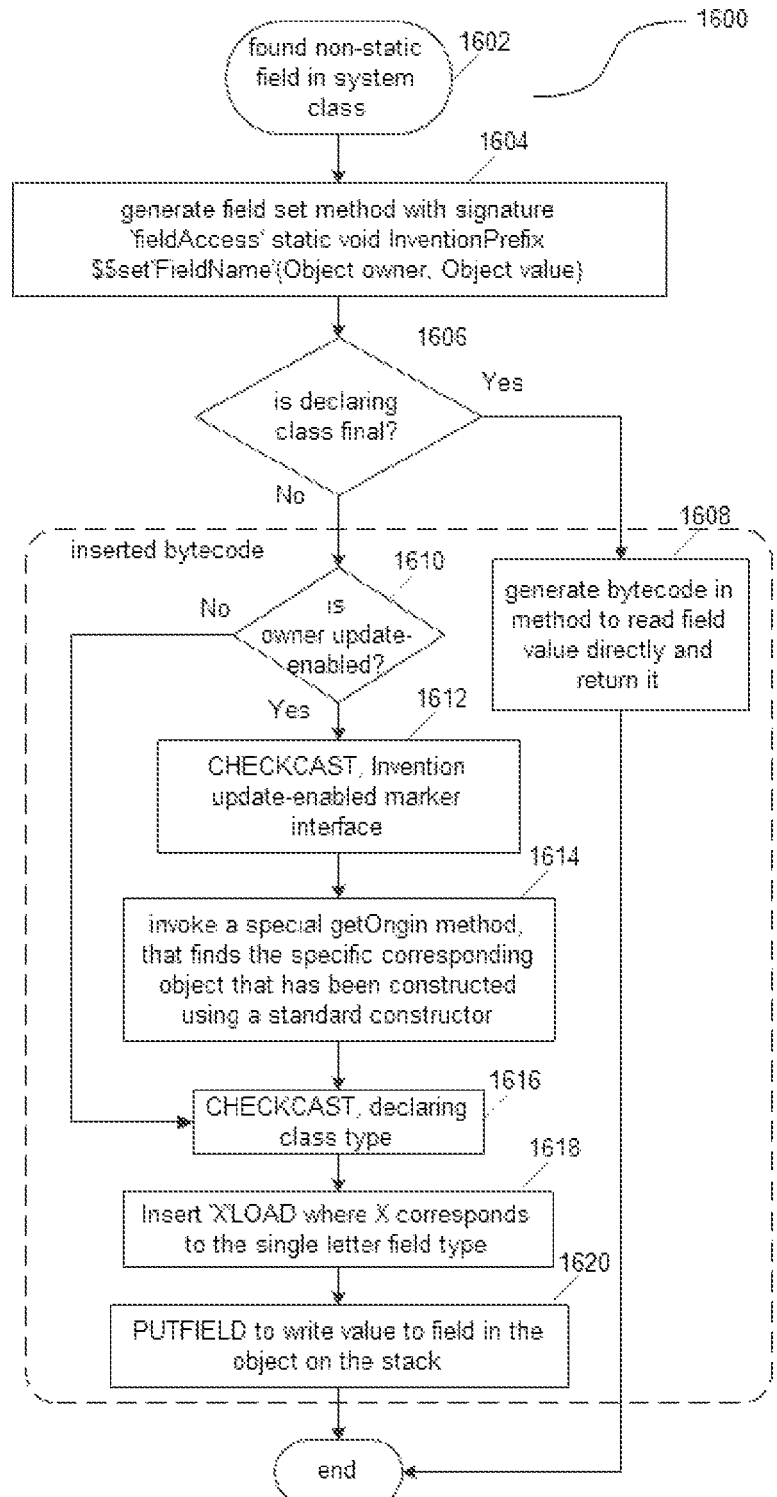
Fig. 9.8

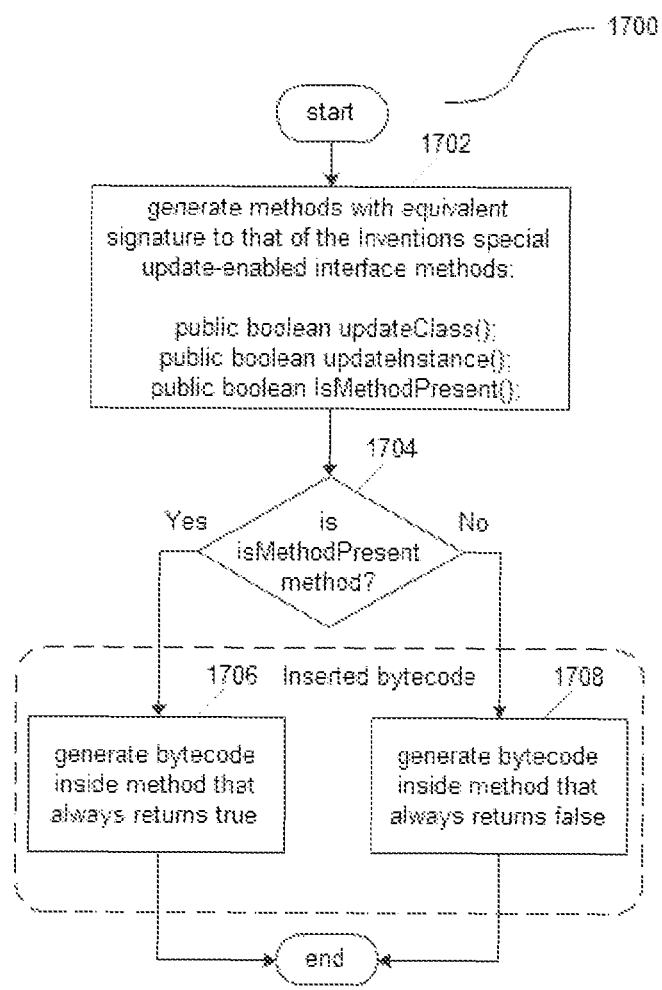
Fig. 9.9

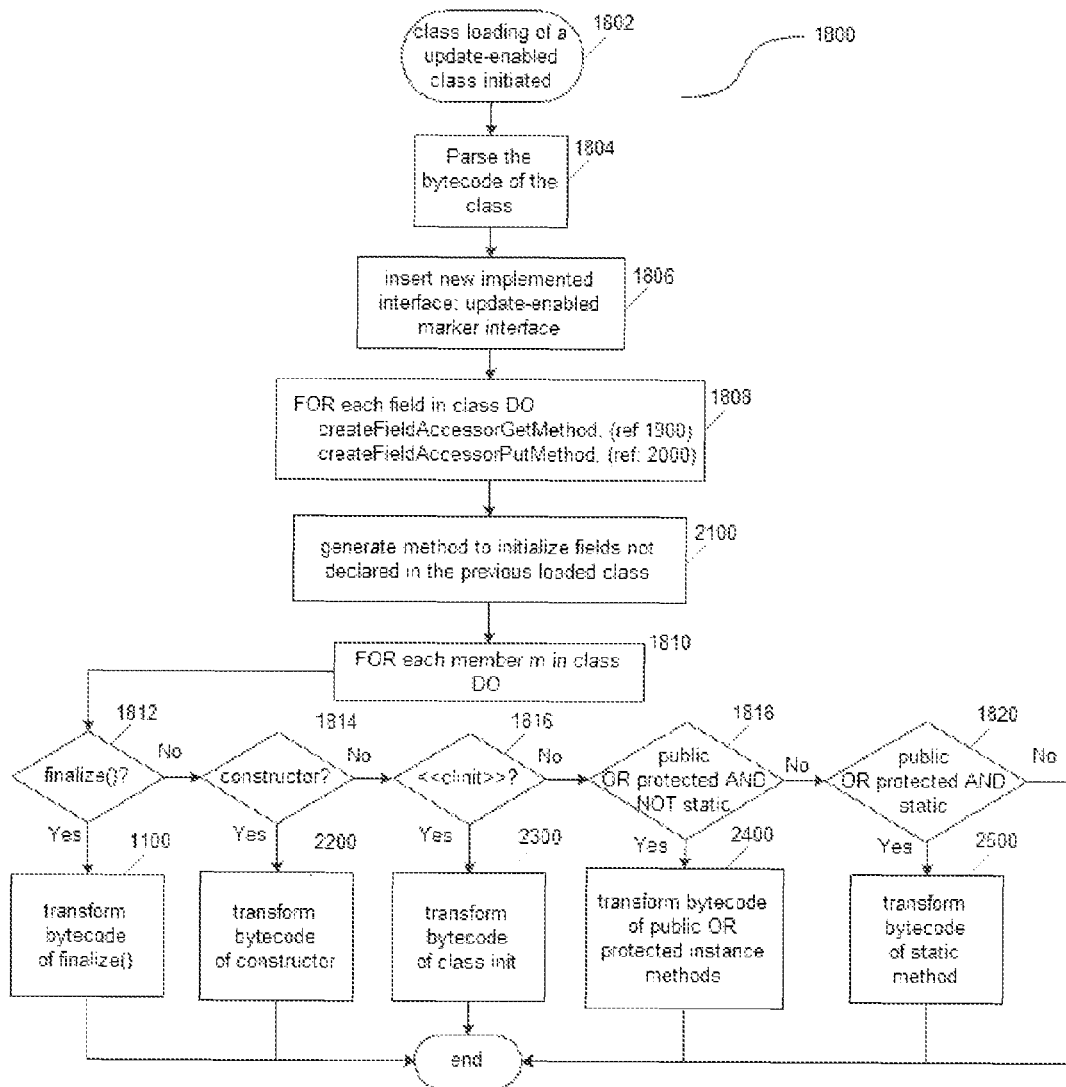
Fig. 9.10

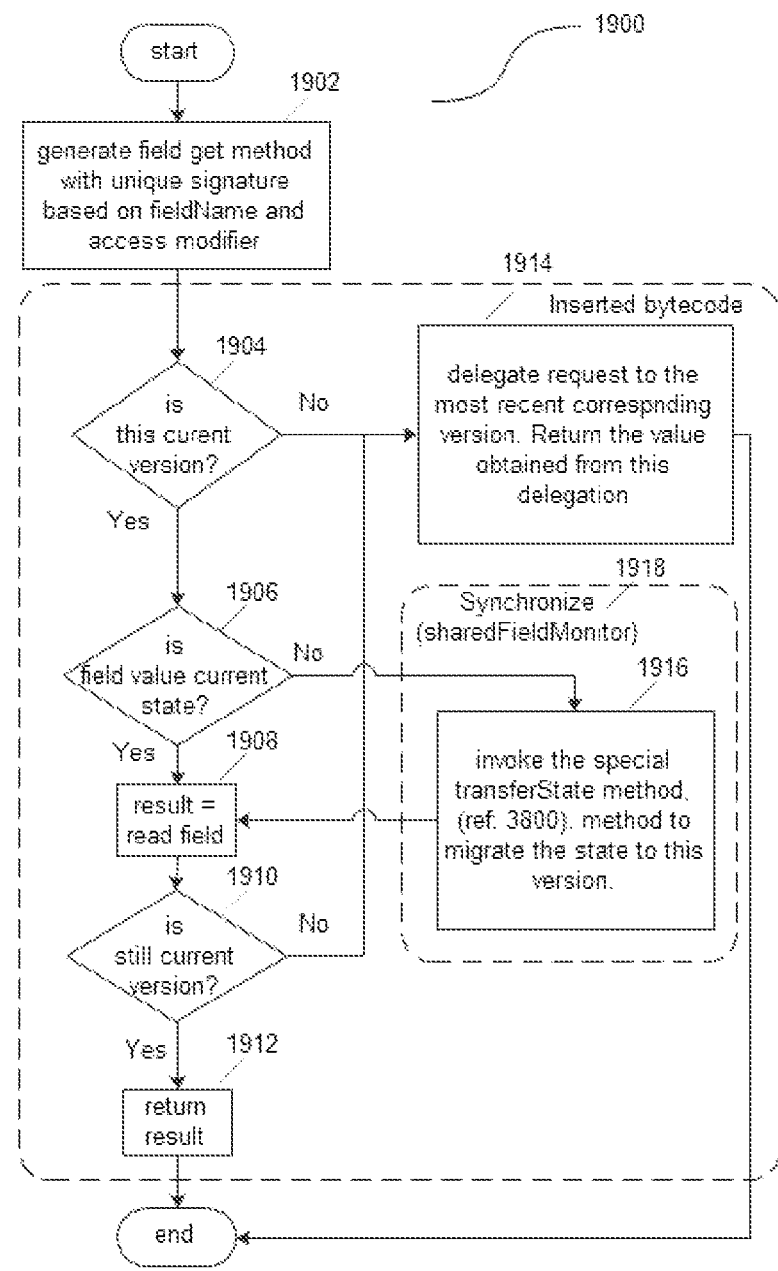
Fig. 9.11

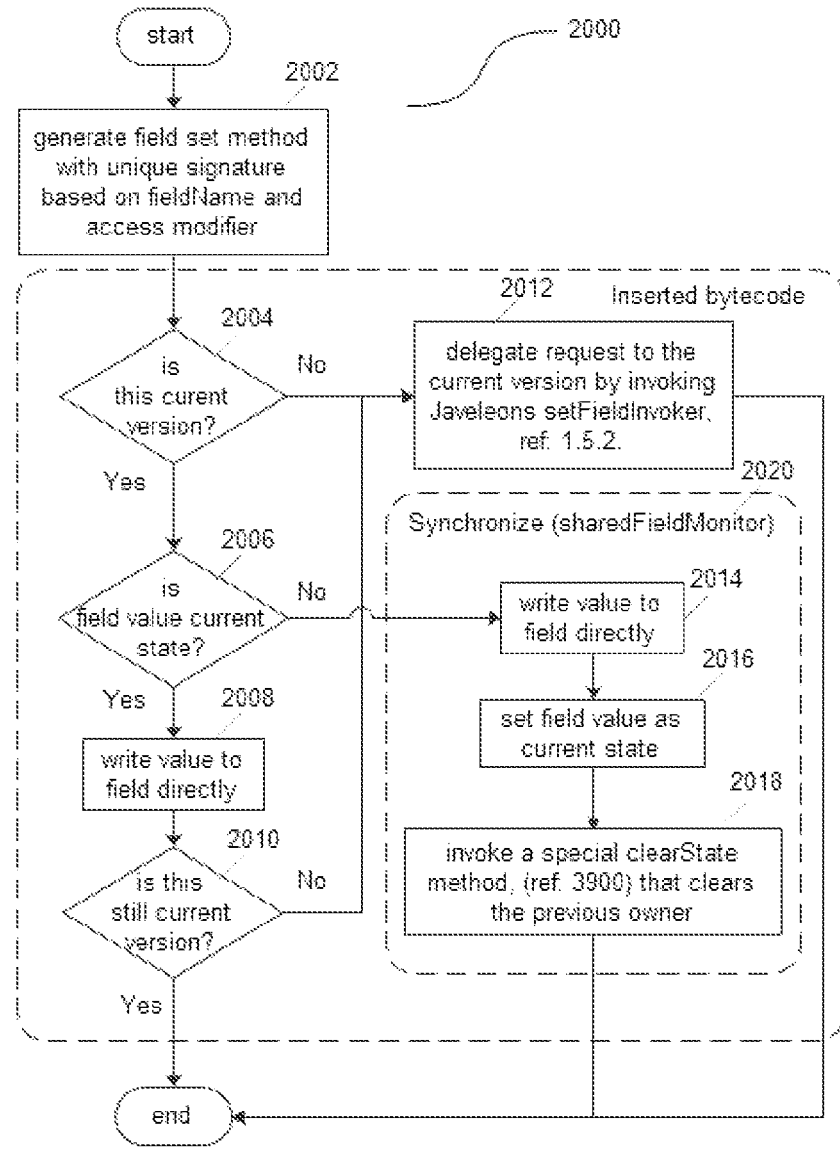
Fig. 9.12

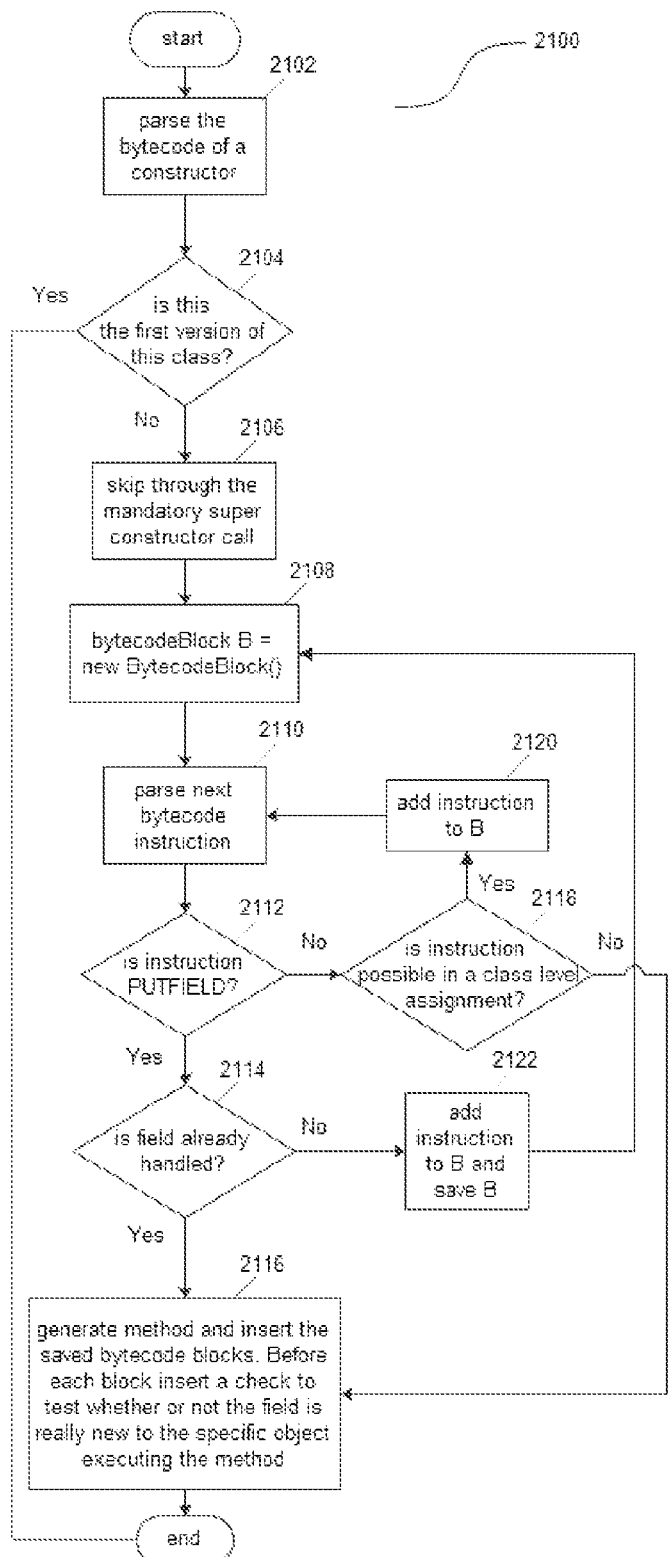
Fig. 9.13

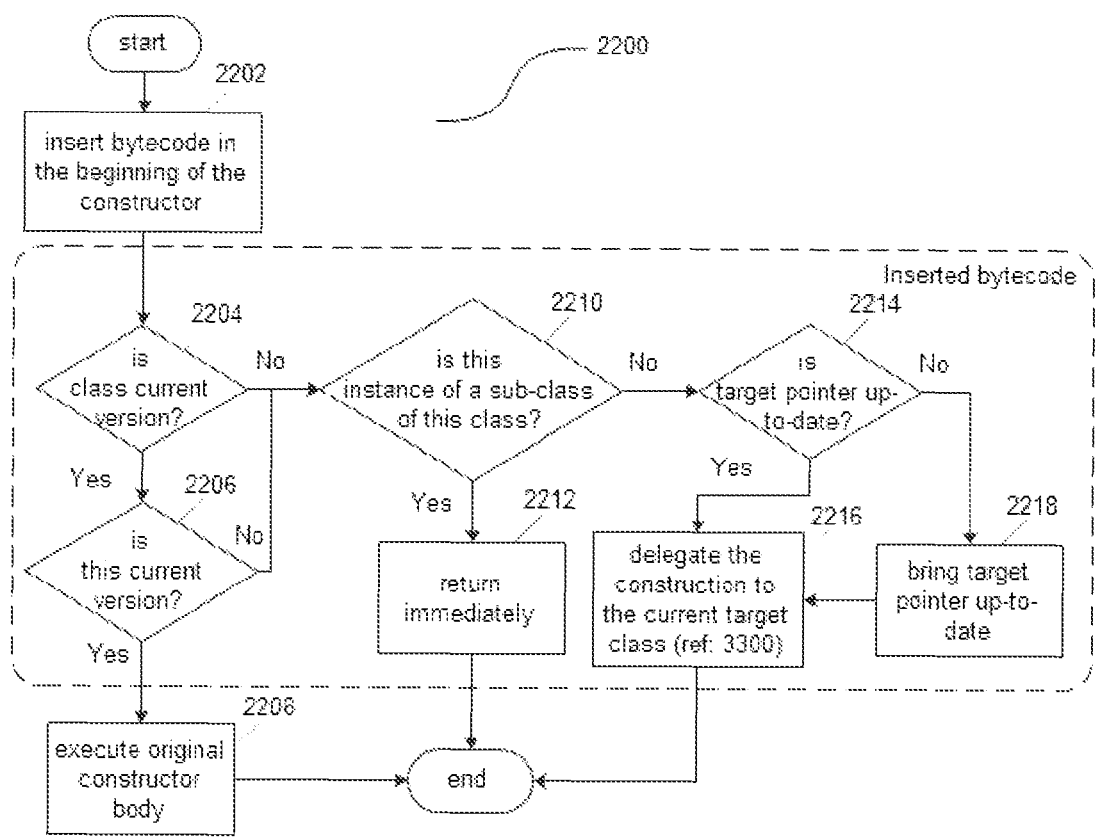
Fig. 9.14

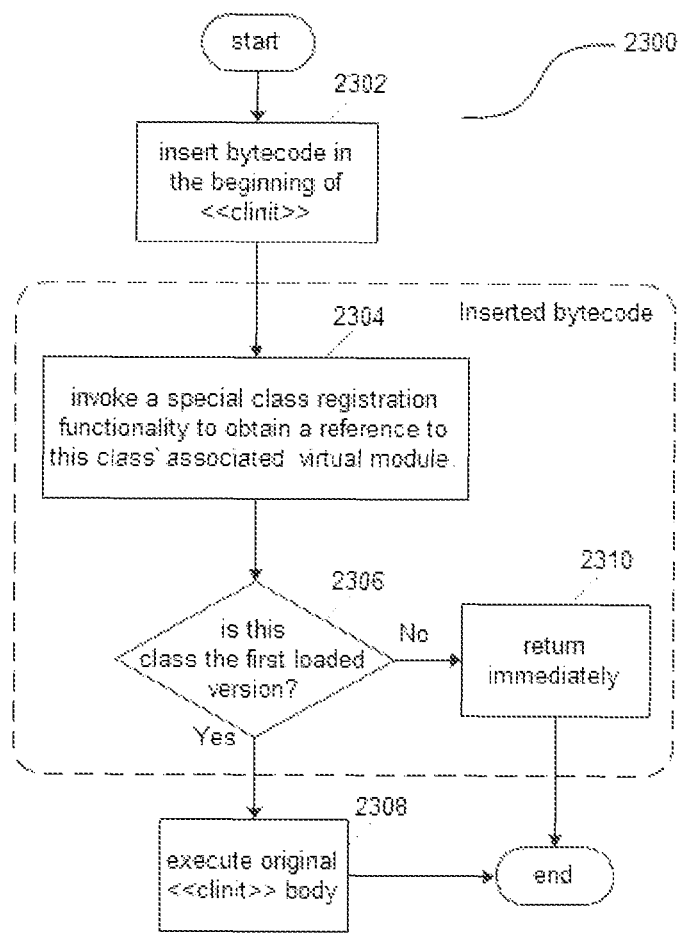
Fig. 9.15

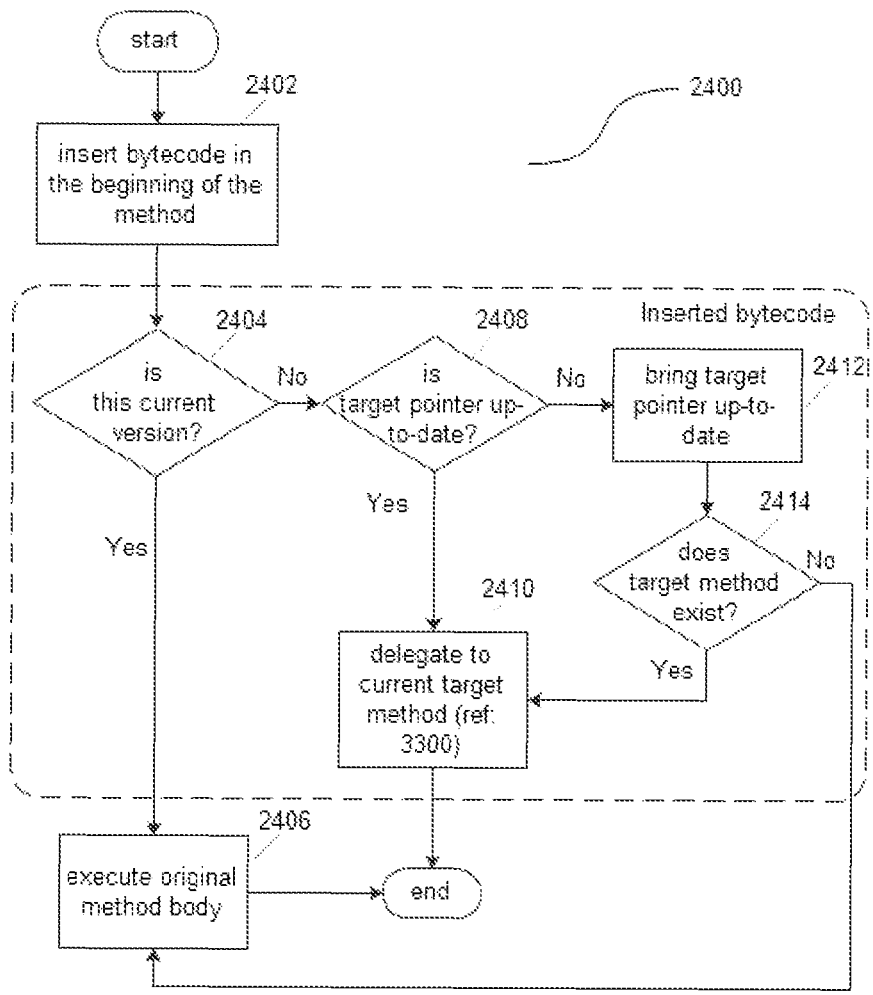
Fig. 9.16

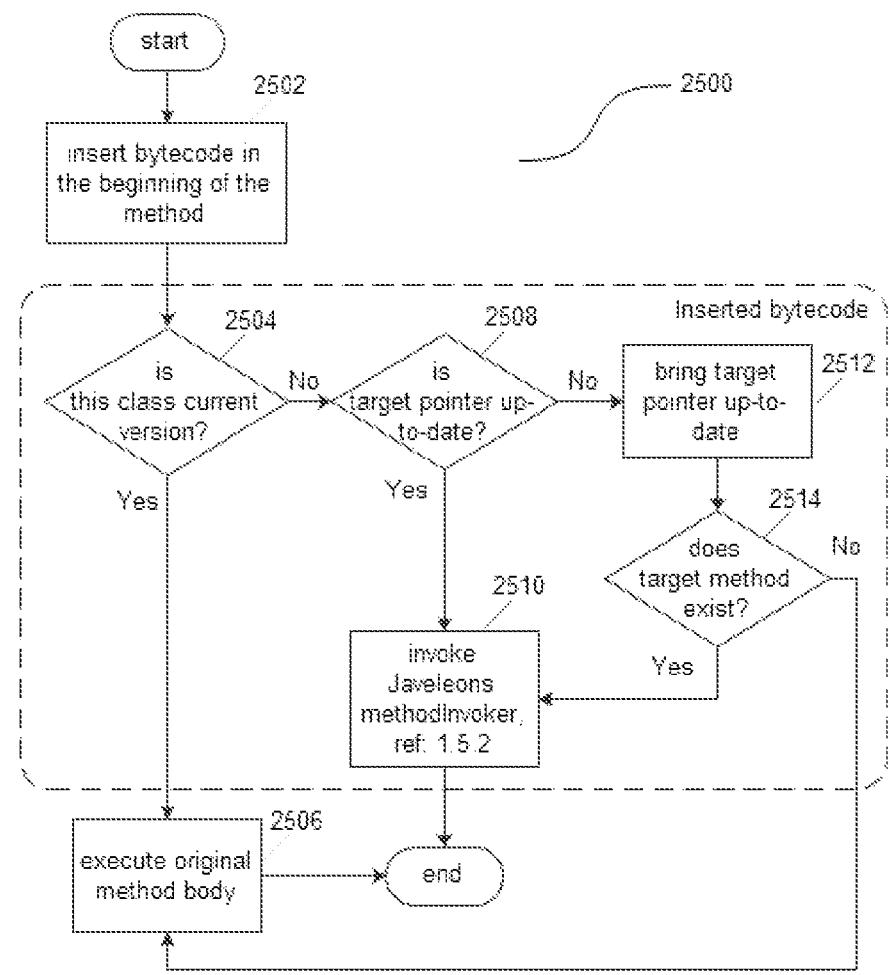
Fig. 9.17

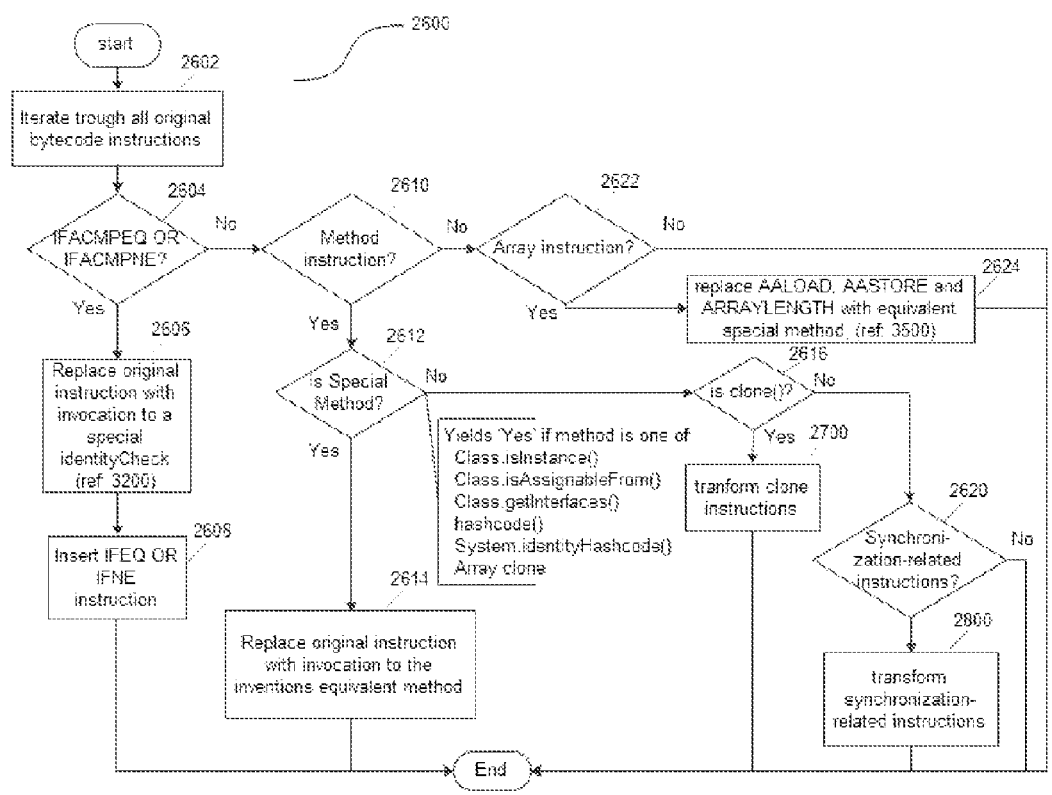
Fig. 9.18

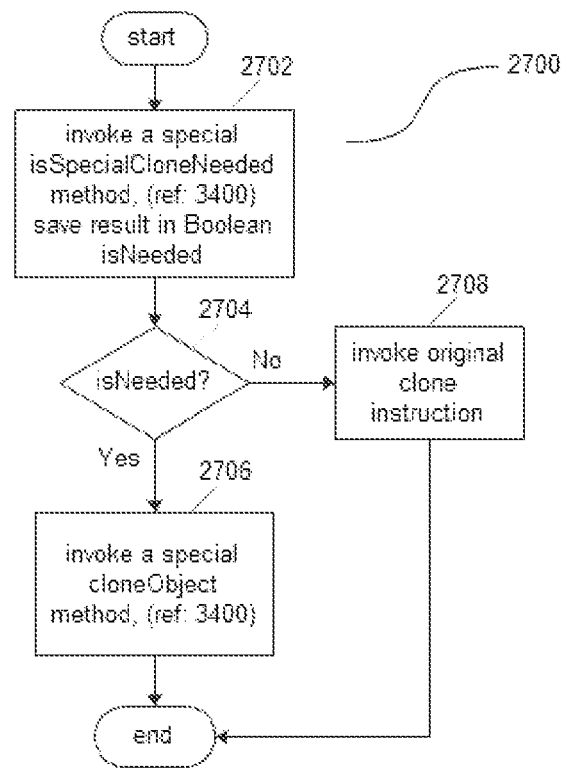
Fig. 9.19

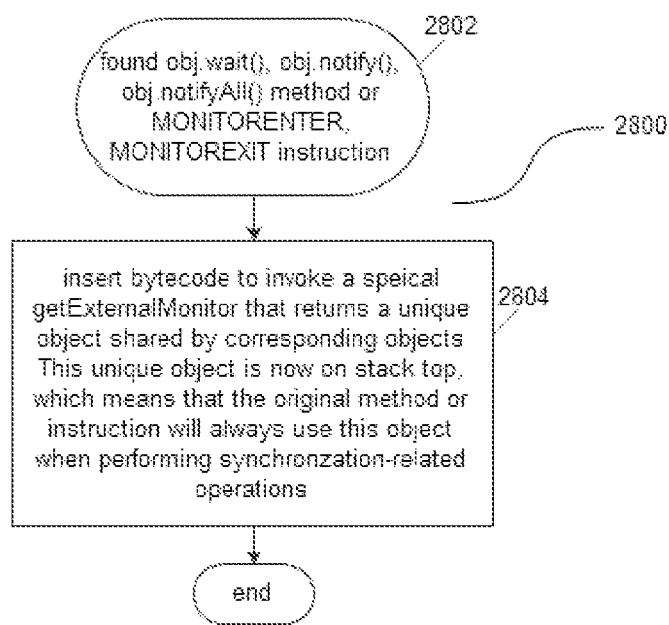
Fig. 9.20

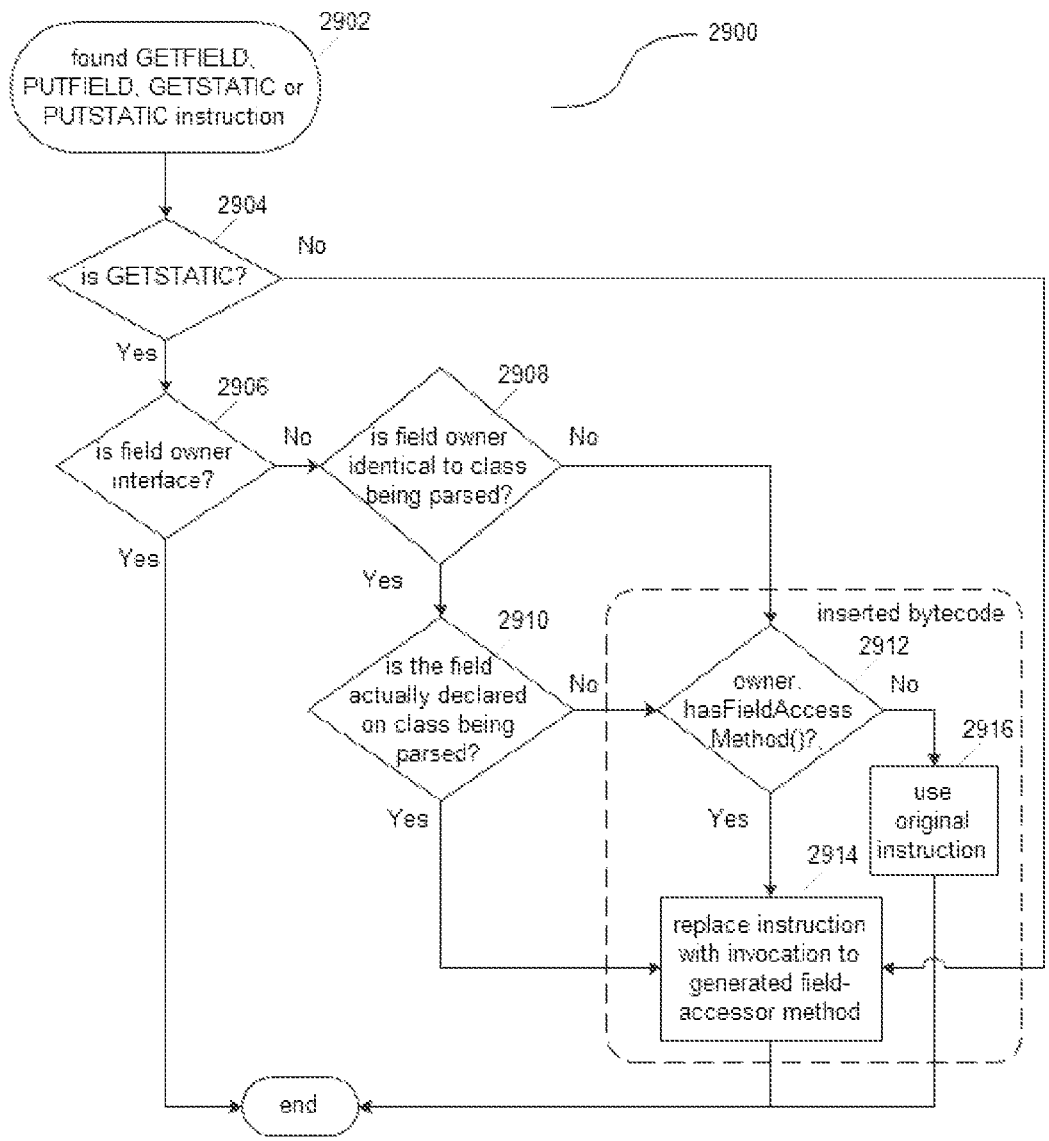
Fig. 9.21

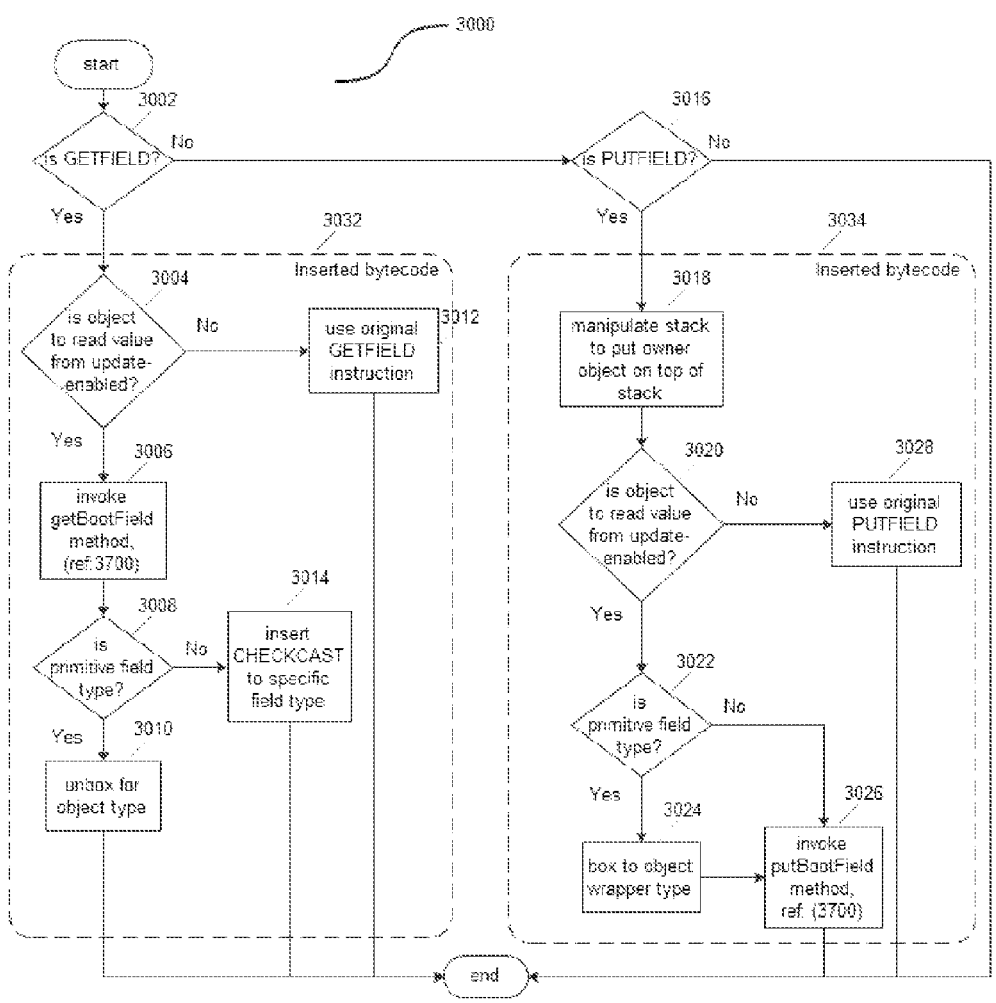
Fig. 9.22

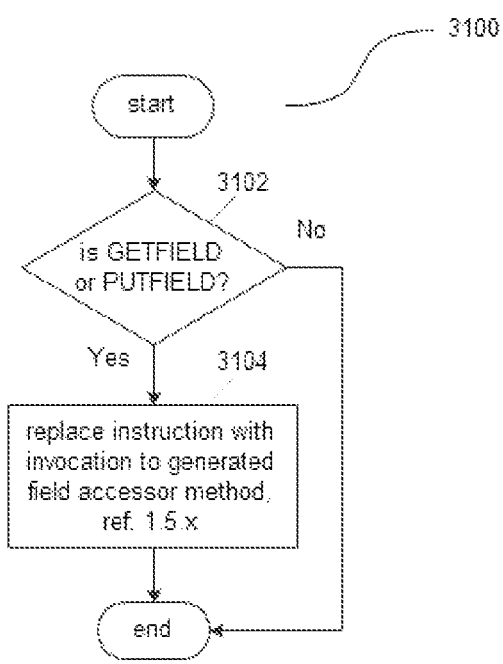
Fig. 9.23

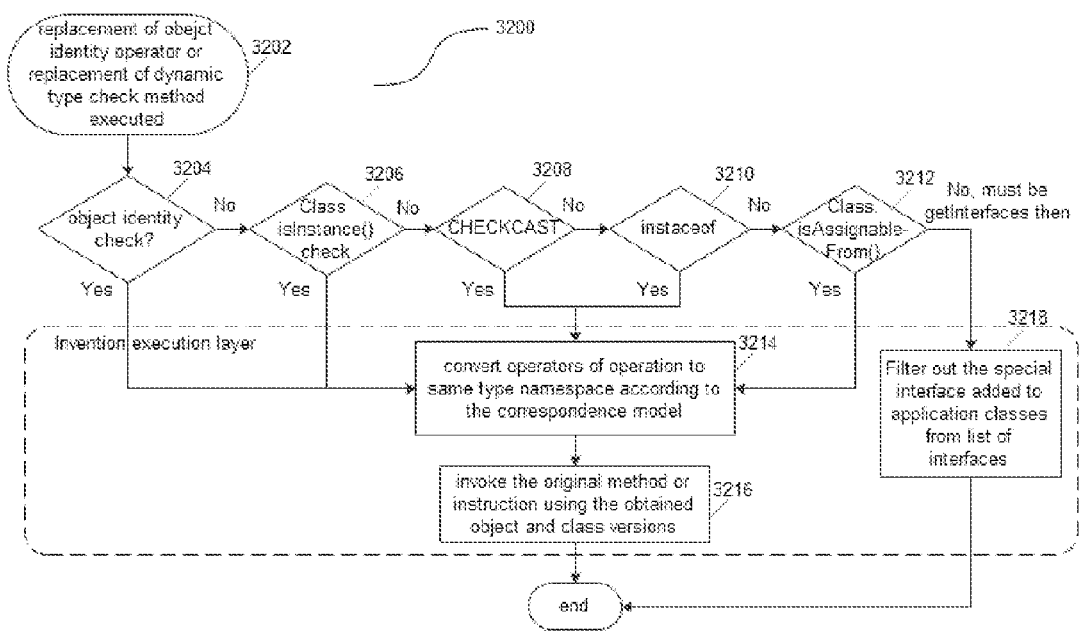
Fig. 9.24

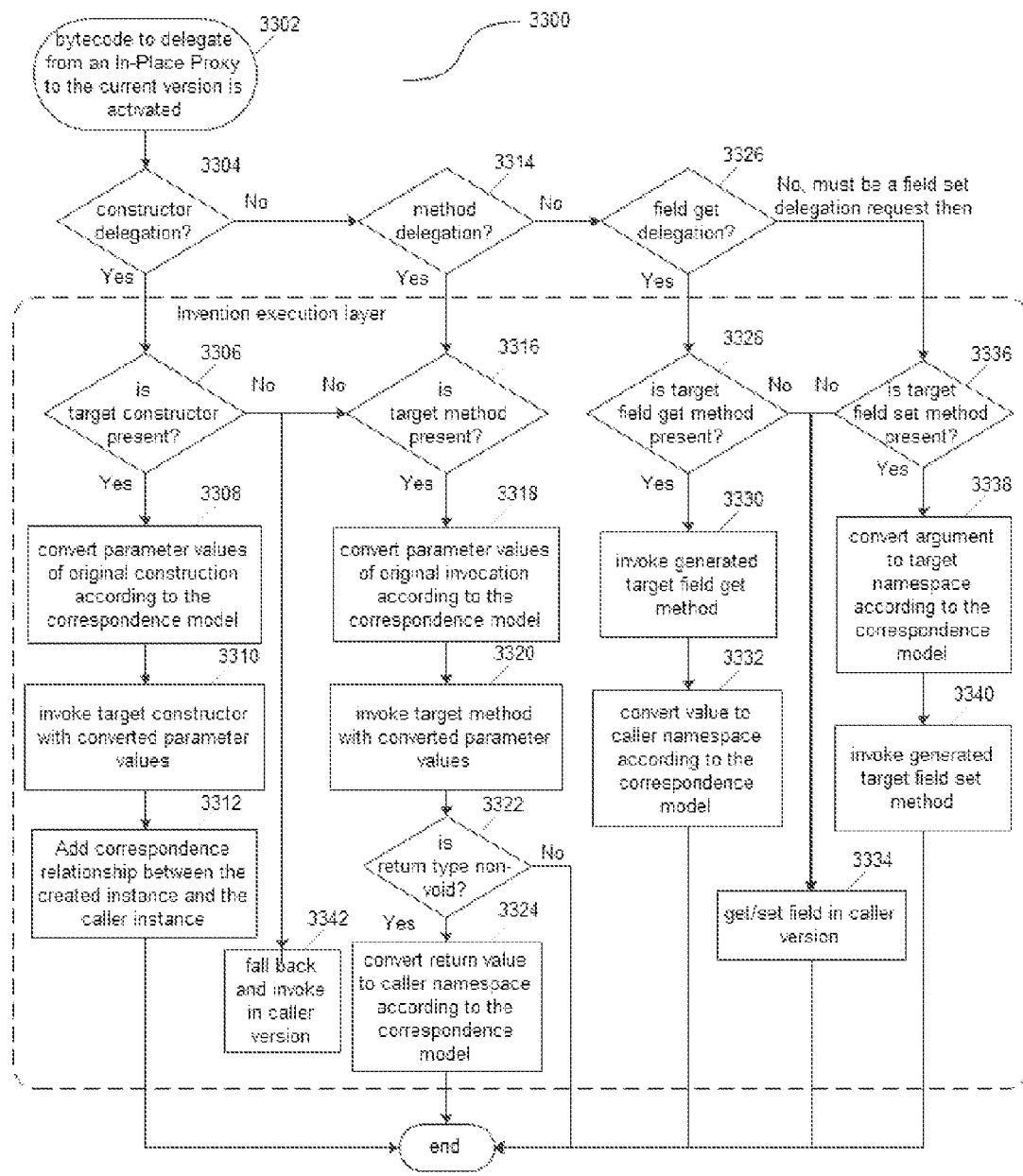
Fig. 9.25

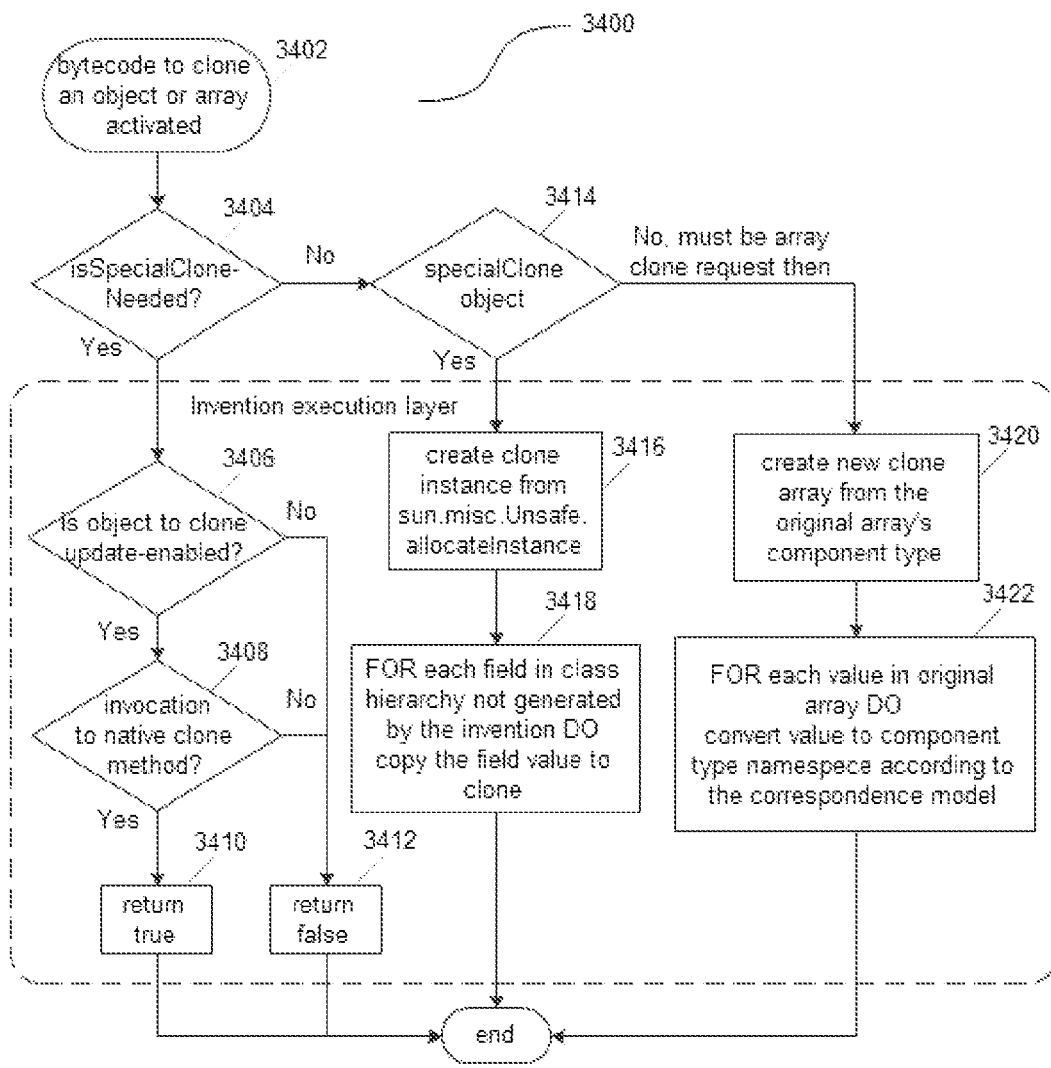
Fig. 9.26

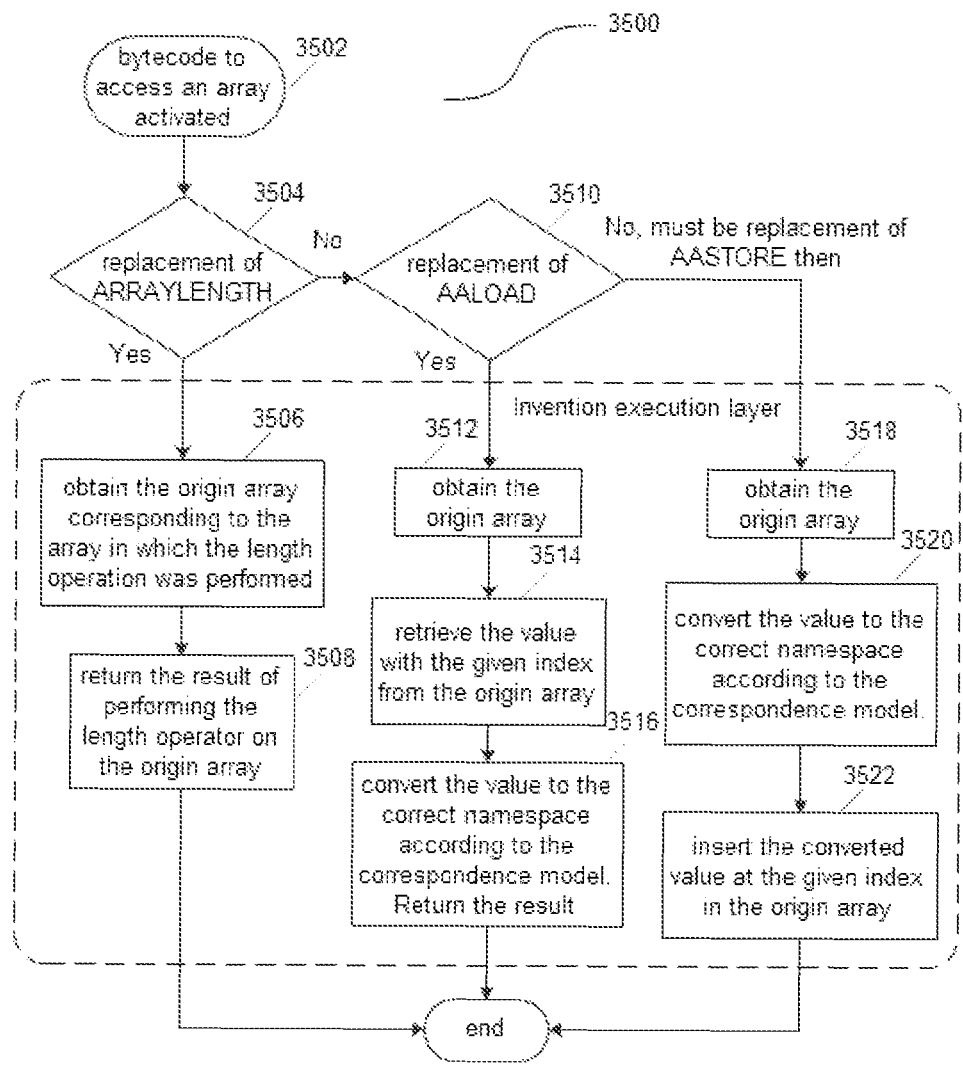
Fig. 9.27

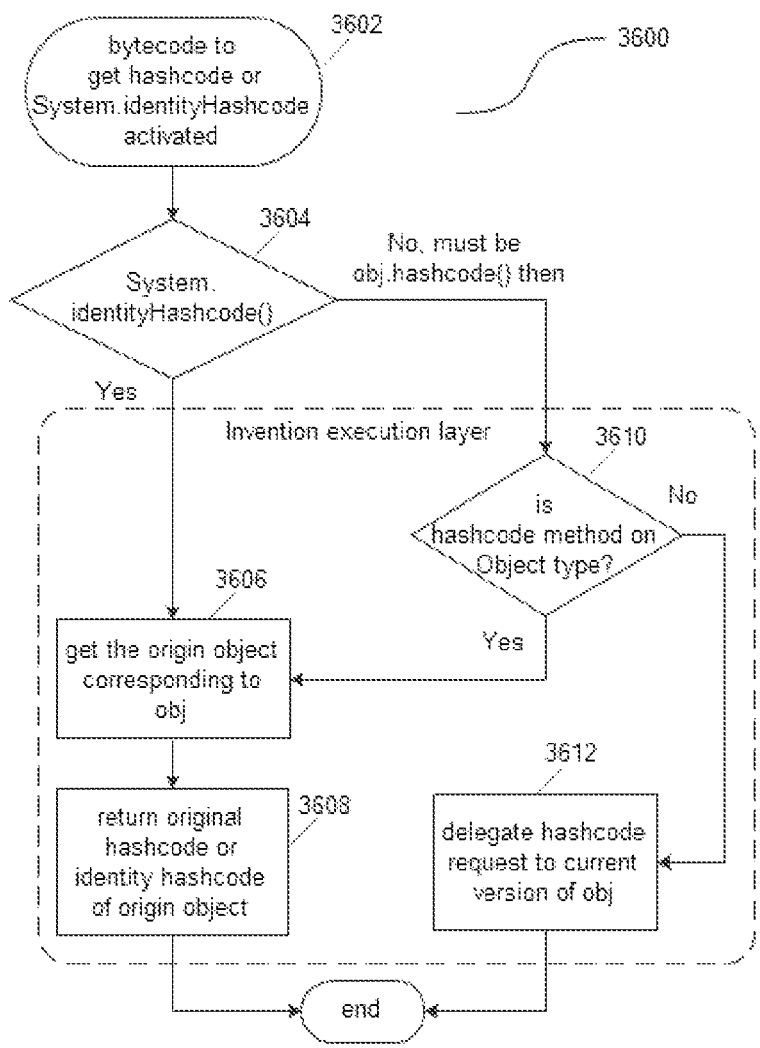
Fig. 9.28

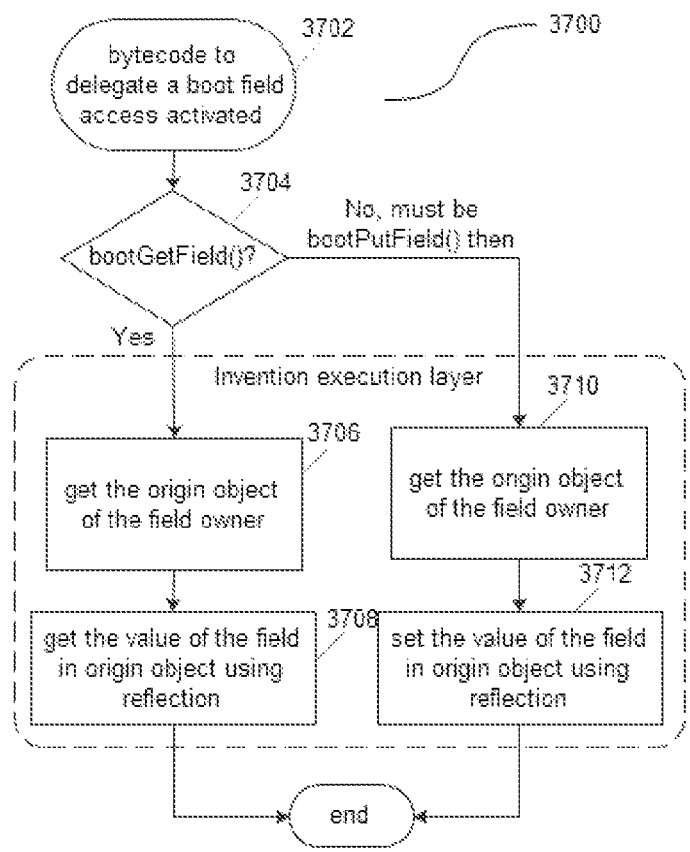
Fig. 9.29

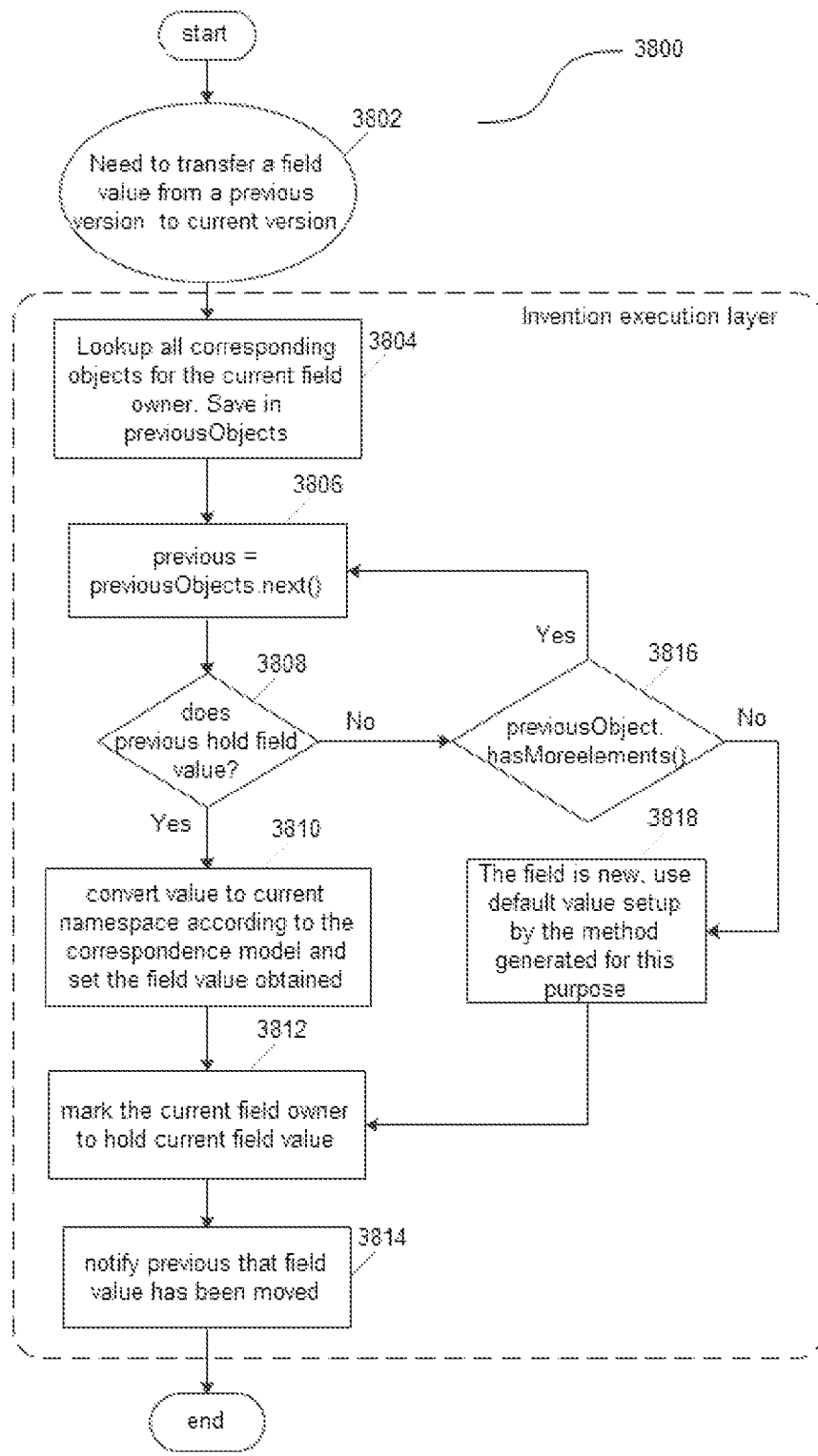
Fig. 9.30

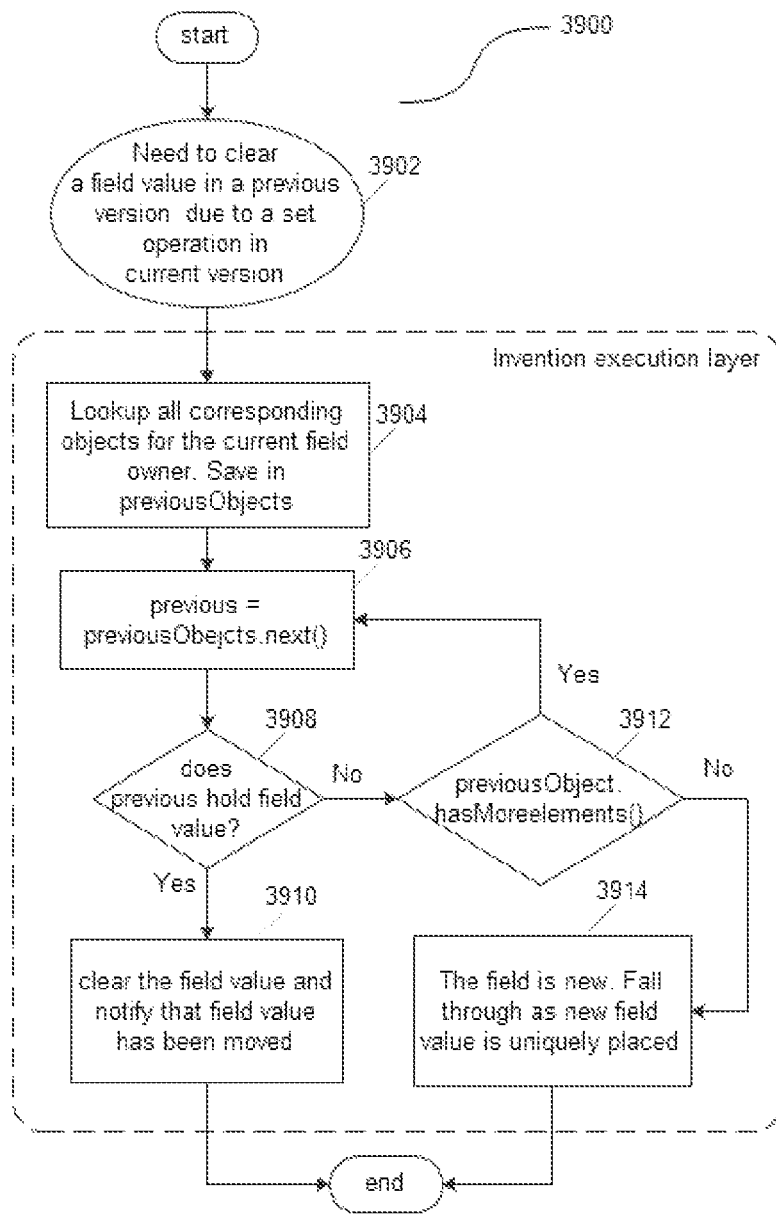
Fig. 9.31

METHOD, COMPUTER PROGRAM PRODUCT, AND SYSTEM FOR NON-BLOCKING DYNAMIC UPDATE OF STATICALLY TYPED CLASS-BASED OBJECT-ORIENTED SOFTWARE

This application is a National Stage Application of PCT/EP2010/067612, filed 16 Nov. 2010, which claims benefit of Ser. No. 61/287,750, filed 18 Dec. 2009 in the United States of America and which applications are incorporated herein by reference. To the extent appropriate, a claim of priority is made to each of the above disclosed applications.

FIELD OF THE INVENTION

The present invention relates to dynamically updating the programming code of software, actively running on a computer system, from its current version to a new version without requiring restarting or causing the software's runtime state to be lost. More particularly, the invention relates to the enablement of dynamically updating both state and functionality of actively running software, written in a statically-typed class-based object-oriented programming language, where the language's compiler produces executable object code in the form of byte-code based class definitions that are dynamically loaded and executed on a virtual machine, as embodied by software written in the Java™ programming language. With the present invention, an actively running software system no longer has to go through the standard halt, redeploy, and restart scheme before changes to the software's programming code take effect, as these changes are effectuated immediately as a consequence of the dynamic update process.

BACKGROUND OF THE INVENTION

There exist high availability computer applications that run on very reliable computer systems for many important applications. These systems and programs typically run 24 hours a day, 7 days a week, and any interruption to processing can have serious repercussions in terms of customer service and, in some situations, safety. For example, the advent of electronic commerce over the Internet and World Wide Web requires that e-commerce websites always be available for processing transactions. Other examples include credit card transaction processing applications, air traffic control applications, etc.

As software for such mission critical applications is enhanced "off-line" on development environments, it becomes necessary to deploy or refresh such enhanced software "on-line" into the production environment. Previous ways of deploying such enhancements has required saving state data, shutting down or otherwise impairing the availability of the critical application, installing the new software, restarting the application or otherwise making it fully available, and then restoring the previous state of the software. At this point, the application would be running the enhanced code with the existing data.

By shutting down the system or introducing another performance impacting event, such as a manual quiescing of the system, service is disrupted. To avoid service disruption, software updates are often delayed as long as possible, with the risk of jeopardizing security and safety. Therefore, there exists a need to apply changes (enhancements and/or maintenance) to one or more modules of software within an actively-running system without requiring a shutdown or interruption of that system. Furthermore, there exists a need to add or delete such modules within an actively-running system.

As a growing class of mission critical applications is written in statically-typed class-based object-oriented programming languages, there is a need to address the specific challenges of dynamically updating classes within individual modules of such applications.

When updating modules, written in a statically-typed class-based object-oriented programming language, on a running system, the updating would need to preserve state information from previous instances of the changed classes and to provide this information to the new instances of these classes. Furthermore, the need exists to ensure that the updating of a set of classes is done atomically, as it otherwise can cause binary incompatibilities, due to changes in the type of the former version and the new version of a class, which will cause runtime failures and bring the whole system to a stop.

The widely accepted statically-typed class-based object-oriented programming language Java™ does have some support for dynamic redefinition of classes, through an implementation of Dmitriev's proposed class reloading facilities [5]. A redefinition may change the programming code of method bodies, the constant pool and attributes. However, a class redefinition must not add, remove or rename fields or methods, change the signatures of methods, change modifiers, or change the inheritance hierarchy. These restrictions are imposed to avoid binary incompatibility issues between subsequent versions of a class. In practice these restrictions render the current class re-definition capability in Java™ unsuitable for supporting most dynamic updates required for large and long-lived mission critical applications.

In [6] Malabarba et al. disclose the method Dynamic Java Classes, that based on a modified Java Virtual Machine with a new dynamic class loader, allows any change to a Java class as long as no other classes, currently present in the actively running software, depend on the part of the class being changed. By imposing this restriction on updated classes, the method becomes dynamically type-safe. For instance, if no other classes depend on a field or method it may be removed. Similarly, changes to a class' type can be made as long as these changes do not cause type violations with the class' dependents. As their new dynamic class loader does not support transitive loading of classes causing type violations, their method is limited to dynamic update of a single class at a time, which is to restricting a change scope for any non-trivial software update. Furthermore, their method has to block all active threads, while updating a class in multi-threaded applications, to prevent race conditions from happening. This blocking of threads causes undesirable bumps in the application execution when software updates take place.

[7] Subramanian et al. disclose the method JVOLVE, that based on a modified Java Virtual machine, allows developers to add, delete, and replace fields and methods anywhere within the class hierarchy. JVOLVE implements these updates by adding to and coordinating VM class loading, just-in-time compilation, scheduling, return barriers, on-stack replacement, and garbage collection. To initialize new fields and update existing ones, JVOLVE applies class and object transformer functions, the former for static fields and the latter for object instance fields. Class and object transformer functions are prepared for each update by a so-called Update Preparation Tool, which examines differences between the former and the new versions of updated classes. JVOLVE stops the executing threads at VM safe points, where it is safe to perform garbage collection (GC) and thread scheduling. JVOLVE makes use of the garbage collector and JIT compiler to update the code and data associated with changed classes. JVOLVE initiates a whole-heap GC to find existing object instances of updated classes and initialize new versions using the provided object transformers. JVOLVE invalidates existing compiled code and installs new byte-code for all changed method implementations. When the application resumes execution, these methods are JIT-compiled when they are next invoked. JVOLVE requires the software to reach a state of quiescence, i.e., all application threads must be stopped at a VM safe point, before an update can take place. The update process uses a stop-the-world garbage collection-based approach that requires the application to pause for the duration of a full heap garbage collection. This synchronized blocking of application threads at VM safe points causes service disruption for unpredictable periods of time.

In [8] Gustavson discloses the method JDrums, that extends a Java Virtual Machine with the ability to update classes while a program is running. To update classes with pre-existing instances in the running program JDrums converts all such objects into objects of the new class according to an update specification. Update specifications must be provided together with the class being updated when starting the update. Similarly it is possible to specify an update specification for static data in the updated classes. The update specifications are defined in Java source code in one so-called CONVERSION CLASS per updated class. The conversion class contains methods that define how the conversion is to be carried out. JDrums does not support dynamically changing the inheritance hierarchy of classes.

In [3] Orso et al. disclose the method DUSC (Dynamic Updating through Swapping of Classes), that based on a hot-swapping technique using indirection via object wrappers, allows the substitution, addition, and removal of classes from a running Java application. DUSC enables dynamic updating by first applying class renaming and code rewriting to introduce object wrappers, and then performing class update by swapping classes at runtime. The method imposed a number of restrictions on application programming: no class in the application is allowed to access public or protected fields of an updated class directly; reflection is not applied to any updated class or any component of an updated class (including any methods that inspect the information about a specific class, such as the methods in java.lang.Class, as a form of reflection as well); a new version of an updated class provides the same interface provided by the previous version of the class; updated classes may not contain native methods; and no methods of updated classes are executing during an update (i.e., no methods of the class are on the stack.) Developers must take all of these restrictions into consideration when programming dynamically updatable applications using DUSC.

In [9] Bialek et al. disclose a method based on partitioning Java applications to make those partitions the updateable unit. The partitions of an application encapsulate the classes they contain and have explicitly provided and required interfaces, making them similar to components. The provided interface of the new partition's implementation must at least include the provided interfaces of the previous version, if not the update is rejected. Hence, the method does not support removal of public members from a provided interface. The information about the partitioning can be either provided by a developer or automatically extracted from source code. The disclosed method allows methods, fields and constructors to be added and method signatures to be changed by using version adapters. Each partition provides a state transfer function. The state transfer function for a partition includes mappings of states of an old partition's objects to their corresponding new versions. Application programmers are required to write these version adapters and state transfer functions. When a partition is updated, all access to the partition is blocked. After the update has finished, the partition is unlocked and the application can continue its normal execution using the new versions of the updated partition's objects.

In [10] Hjalmtysson and Gray disclose the method, Dynamic C++ classes, that allows run-time updates of an executing C++ program at the class level. The method address the issue that C++ does not directly support the creation of dynamically loadable modules, which makes preserving program-level abstractions across the dynamic-linking interface difficult. Dynamic C++ Classes is based on a proxy approach that exploits common C++ features and can be compiled with most modern compilers. The proxy approach supports version updates of existing classes as well as the introduction of new classes. To do so, the main program must be able to communicate with (invoke the methods of) the new implementation. Thus, each implementation must have an interface that is known to the main program at compile time. Each new implementation either updates an existing class (a new version) or introduces a new class (a new type) that uses the known interface. Due to this restriction, the method is restricted to update of methods only.

In [11] Stanek et al. disclose the method Dynamically Evolvable C++ Classes, that allows C++ classes to be dynamically updated. It includes the ability to add, remove, update, merge, and split classes. Dynamically merging and splitting of classes is enabled using state transformation functions. For an application to be used together with Dynamically Evolvable C++ Classes, some preparation of the application is needed. The preparation consists of: (a) writing the application using the smart pointer and container templates provided by the underlying framework of Dynamically Evolvable C++ Classes; (b) implementing for each class a common API defined by the framework; (c) implementing factory methods for instance creation and destruction; (d) compiling each class into a separate dynamically linked library; and (e) registering each of the dynamic class libraries with the class registry of the framework. The underlying framework is based on smart pointers, implemented as C++ templates, to keep track of object references after the state transformations of an update. As presented, the method only applies to single threaded applications, as safe state transformation under race conditions in multi-threaded applications are neglected.

In [12] Chen et al. disclose the method POLUS, that allows multithreaded software to be dynamically updated by running the old and new versions in parallel. POLUS achieves parallel execution by allowing simultaneously coexistence of both the old and the new versions of application data, and maintains the coherence between versions by calling some state synchronization functions whenever there is a write access to either version of the data to be updated. POLUS write-protects either version of the data during the updating process using the debugging APIs provided by operating systems (e.g. ptrace in Unix and DebugActiveProcess in Windows). This synchronization approach ensures consistency when several threads concurrently access different versions of data in multithreaded software. Parallel execution terminates as soon as there are no active threads in the old version. From there on, all function calls are redirected from the old version to the new version, using binary rewriting to insert an indirect jump instruction in the prologue of the original function. POLUS is design for dynamic update of imperative (procedural) programming languages, like the C programming language.

POLUS is therefore not applicable to class-based object-oriented programming languages.

U.S. Pat. No. 7,530,077 discloses a method and service for enabling a smallest unit of variable data within a data space of a user application to be dynamically updated using an external source. The application GUI is enhanced with a dynamic update utility (DUU) that enables the data unit to be selected and linked to the broker topic. Where the present invention addresses dynamic updating the programming code of actively running software, without losing the active state, the method of U.S. Pat. No. 7,530,077 addresses dynamic update of data values, a different problem.

U.S. Pat. No. 6,629,315 discloses a method, computer program product, and system for dynamically refreshing software modules within an actively running computer system. An existing module or multiple modules (recognizable units of executable code) are ready for execution in an active computer system. New modules corresponding in function to the existing modules are loaded into the computer system memory for updating the existing modules. The new modules are prepared for execution by pointing to corresponding state data currently being used by the existing modules and otherwise made ready to take over execution. A lock is held on execution exclusively by the refreshing process for a relatively brief moment in order to switch access from the call point or call references from the existing modules to the new modules. Releasing the lock allows execution of the new modules with the existing data thus accomplishing the update or refresh of the modules. Finally, the previous or "old" modules are removed from memory. Where the present invention enables non-blocking dynamic update of actively running software written in a statically-typed class-based object-oriented programming language, the method of U.S. Pat. No. 6,629,315 is restricted to blocking dynamic update of software written in a procedural language.

In view of the foregoing, there exists a need for a system, method and program product for transparent non-blocking dynamic updating of statically-typed class-based object-oriented software, without requiring the software or the computer running the software to be restarted, and without losing runtime state of the software as a consequence of performing an update on it.

SUMMARY OF THE INVENTION

An embodiment of the present invention provides a system, method and program product for non-blocking dynamic update of statically-typed class-based object-oriented software, compiled to byte-code and executing in a platform-independent virtual machine on an actively running desktop, server, mainframe or embedded computing device. Specifically, under the present invention, to avoid the need for restarting the software to make changes between versions of the software's programming code to take effect, the byte-code for different versions of the software's class definitions undergoes a series of transformations when they are loaded into the virtual machine. These transformations allow runtime switching of all live objects of a previous version of a class, as present in an actively running computer system, into surrogate objects for corresponding objects of new versions of the class that has been dynamically loaded after the objects were instantiated from a previous version of the class; wherein, the object identity and class type assignability are shared between surrogates and their co-existing versions of objects and classes. The invention operates by first performing pre-boot byte-code transformations of Virtual Machine specific bootstrap classes, to prepare bootstrap classes for future updates to application sub-classes of the bootstrap classes, by injecting byte-code into the bootstrap classes so that extended and/or overridden behavior, as defined by updated subclasses, are effectuated for already instantiated objects of former versions of the updated bootstrap classes. Next, the invention proceeds by executing the application instance in which the transformed bootstrap classes constitutes the new set of Virtual Machine bootstrap classes for the application instance. During execution, the invention, intercepts the loading of the byte-code of every class loaded into the Virtual Machine and once class loading is initiated, the invention in successive phases, transforms the byte-code of the class to enable shared object identity and class type identity for correspondent co-existent objects and classes. Depending on the category of a loaded class, the invention performs different transformations: byte-code of system classes are transformed, to prepare system classes for future updates of application subclasses derived from them, this is achieved by injecting byte-code into the system classes so that extended and/or overridden behavior, as defined by updated subclasses, are effectuated for already instantiated objects of former versions of the updated subclasses; byte-code of application classes is transformed to make application classes update-enabled by injecting byte-code into the application classes, thereby enabling run-time switching of application classes and instances hereof to become surrogate classes and objects for future corresponding objects and classes, to which the identity and state is automatically transferred in a non-blocking fashion. Finally, on the event of a software update, wherein the software update comprises the byte-code for the change set of class definitions that constitute the difference between the currently running system and the new version, the invention, performs a non-blocking software update of the actively running computer system by transparently switching the behavior of the currently live objects instantiated from a class in the change set to become un-initialized surrogates for future on-demand instantiated corresponding objects of the new class definition.

In a variation of this embodiment, wherein the object identity and state of live objects are paired on first usage after a dynamic software update to the new corresponding versions of the objects of a later version of the class, transforming the byte-code involves first constructing new un-initialized correspondent objects of the updated class version, then constructing unique identity id's for corresponding objects, ensuring that future enhanced identity checks of objects yield true for corresponding objects regardless of their specific version, and finally migrating the state from former corresponding versions of the objects on first usage after the class update.

In a further variation, transforming the byte-code inserts an automatically generated byte-code method into application classes that initializes the part of the state that is new to the surrogate object that triggered the construction of the un-initialized corresponding object.

In a further variation, transforming the byte-code ensures that multiple classes representing different versions of the same class can co-exist, by loading an updated class with a separate class loader, thus multiple types representing the same class are loaded into the virtual machine, and replacing the byte-code in classes that performs dynamic class type operations as defined by the language, by byte-code that performs the dynamic class type checks in which the operands of the dynamic class check operations are replaced by the corresponding versions that share the same type namespace.

In a further variation, transforming the byte-code ensures that forwarding of method calls transforms an object into a surrogate which forwards all access to its members to a new corresponding object of a newer version of the same class. This is achieved by first transforming the byte-code of classes such that a client referencing any one of multiple corresponding objects will always see an object with a type assignable from the reachable types of its own class loader. This involves replacing the virtual machine byte-code instruction 'instanceof' by byte-code that performs the 'instanceof' check on the specific corresponding object representation that complies with the type namespace of the right hand side operand of the 'instanceof' instruction, then replacing the virtual machine byte-code instruction equivalent for 'CHECKCAST' by byte-code that performs the 'CHECKCAST' instruction on the specific corresponding object representation that complies with the type namespace of the right hand side operand of the 'CHECKCAST' instruction, and finally performing runtime switching of the class and objects of previously loaded versions of a class into surrogates that will redirect any future request to the corresponding new class and objects, wherein the possible value obtained from the new corresponding representation is replaced by the surrogate representation that complies to the type namespace of the caller of the surrogate member, and wherein the inserted byte-code for controlling the redirect process replaces the parameters given by the caller of the surrogate member by the corresponding representation that complies with the type namespace of the receiver of the redirect process.

In a further variation, transforming the byte-code ensures efficient forwarding by caching of the virtual machine representation of method calls from surrogate objects to the corresponding new objects.

In a further variation, byte-code transformation enables shared object identity between live objects of different versions of the same class, by replacing the virtual machine byte-code instruction to compare objects for identity by byte-code that performs the identity check using the corresponding object versions belonging to the same type namespace.

In a further variation, state is shared between multiple corresponding objects instantiated from different versions of the same class, by generating byte-code in application classes that wraps field-accesses in one generated get method per declared field and one generated set method per declared field, keeping record of which object version in the set of corresponding objects representing the same object holds the individual shared field values at present. The get method ensures that when invoked on surrogate objects the field read request forwards to the most recent corresponding version of the surrogate object, wherein the field value obtained from the most recent corresponding object is converted to that of the type namespace of the surrogate object. This ensures that if the field value is not currently present in the most recent corresponding object, the field value is searched for in the corresponding objects and transferred by first converting it to the type namespace of the most recent corresponding object. Doing so ensures that if the field value is present in the most recent corresponding object the field value is read and returned if there has been no update in the meantime; that is, if an update of the class declaring the generated field get method happens after the field value has been read, it forwards the read request to the most recent corresponding version of the surrogate object wherein the field value obtained from the most recent corresponding object is converted to that of the type namespace of the now surrogate object. Similarly, the algorithm inserted into the set method ensures that when invoked on surrogate objects the field write request forwards to the most recent corresponding version of the surrogate object, wherein the field value forwarded to the most recent corresponding object is converted to that of the type namespace of the most recent corresponding object, hereby ensuring that if the field value is not currently present in the most recent corresponding object the field value is written and the corresponding object that previously held the field value is found and asked to clear the previous state. This ensures that if the field value is present in the most recent corresponding object the field value is written if there has been no update in the meantime, and if an update of the class declaring the generated field set method happens after the field value has been written, it forwards the read request to the most recent corresponding version of the surrogate object wherein the field value forwarded to the most recent corresponding object is converted to that of the type namespace of the most recent corresponding object.

In a further variation, transforming the byte-code ensures that the transfer of state from a previous version to the most recent corresponding object executes under a temporary locking mechanism shared by corresponding objects.

In a further variation, transforming the byte-code ensures that the clearing of state in a previous correspondent version executes under a temporary locking mechanism shared by corresponding objects.

In a further variation, transforming the byte-code ensures synchronized access for threads to an object and its group of surrogate objects using a common synchronization object. Transforming the byte-code includes two steps: replacing the built-in synchronization access modifier by byte-code that inserts a MONITORENTER equivalent instruction at the beginning of methods and MONITOREXIT equivalent instructions on every exit point of methods, wherein the object being synchronized on is identical for corresponding objects and classes, and replacing the -operations that perform synchronization as defined by the language by byte-code that exchanges the object being synchronized on by the uniquely identifiable object that is identical for corresponding objects.

In a further variation, transforming the byte-code involves inserting byte-code at the beginning of each method in application classes ensuring that surrogate objects automatically adapt the forwarding to the corresponding object instantiated from the newest version of the class available.

In a further variation, transforming the byte-code ensures that access to an object is forwarded by replacing definitions of method bodies at runtime.

In a further variation, transforming the byte-code ensures that a live object is dynamically switched into a surrogate object without blocking any thread currently executing code within the object during the switch.

In a further variation, transforming the byte-code ensures that surrogate objects share state and identity, with the on-demand constructed correspondent object instantiated from the newest version of the class.

In a further variation, transforming the byte-code ensures that the surrogate object shares state with the on-demand constructed correspondent object instantiated from the newest version of the class.

In a further variation, transforming the byte-code ensures that the surrogate object shares identity with the on-demand constructed correspondent object instantiated from the newest version of the class.

In a further variation, transforming the byte-code ensures that clients of a surrogate object hold one or more references to the type of the class of the surrogate object, but use the method bodies of the newest version of the class through the forwarding of surrogate members to the newest correspondent class version available.

In a further variation, transforming the byte-code involves replacing all reflective mechanisms to read object state directly by byte-code that invokes the associated generated get method in the declaring class.

In a further variation, transforming the byte-code involves replacing all reflective mechanisms to write object state directly by byte-code that invokes the associated generated set method in the declaring class.

In a further variation, transforming the byte-code involves inserting byte-code at the beginning of the class initialize method to ensure that the original code in the class initialize method is not executed in case a former version of the class has previously been loaded into the virtual machine.

In a further variation, transforming the byte-code involves inserting byte-code at the beginning of object constructors to ensure that constructors neither execute the original code nor redirect the constructor invocation to the corresponding object of the newest version of the class, if the construction happens on a surrogate instance of a sub class of the declaring constructor.

In a further variation, transforming the byte-code involves inserting byte-code at the beginning of object finalizers to ensure that finalizers neither execute the original code nor redirect the finalize invocation to the newest corresponding object if the finalization happens on a surrogate instance.

In a further variation, transforming the byte-code involves replacing occurrences of cloning as defined by the language by byte-code that ensures that the created clone contains state equivalent to that of the state shared by all corresponding objects of the object being cloned.

In a further variation, transforming the byte-code involves replacing occurrences of object serialization by byte-code that replaces the object to be serialized by the most recent corresponding object wherein the inserted byte-code ensures that the shared object state is transferred to the most recent corresponding object before continuing the serialization process.

In a further variation, transforming the byte-code involves replacing instructions to access arrays by byte-code that redirects the access request to the most recent corresponding array object, by first converting the value obtained by a replaced array read operation to that of the caller class' type namespace, and then converting the value to use in the replaced array write operation to that of the most recent corresponding array object type namespace.

In a further variation, transforming the byte-code allows the type information of a new version of a class that has been dynamically loaded, to indicate an inheritance hierarchy that is different from that of previous loaded versions of the class.

In a further variation, transforming the byte-code allows the type information for a new version of a class that has been dynamically loaded, to indicate a different interface than the ones of previous loaded versions of the class.

In a further variation, transforming the byte-code allows method declarations, in a new version of a class that has been dynamically loaded, to be different from those in previous loaded versions of the class.

In a further variation, transforming the byte-code allows field declarations, in a new version of a class that has been dynamically loaded, to be different from those in previous loaded versions of the class.

Other methods, systems, and/or computer program product according to embodiments will be or become apparent to one with skill in the art upon review of the following drawings and detailed description. It is intended that all such additional methods, computer program products, and/or systems be included within the description, be within the scope of the present invention, and be protected by the accompanying claims.

BRIEF DESCRIPTION OF THE DRAWINGS

A more particular description of the invention briefly described above will be rendered by reference to specific embodiments thereof which are illustrated in the appended drawings. These drawings depict only one or more typical embodiments of the invention and are not therefore to be considered to be limiting of its scope. With respect to the following drawings, like reference numbers denotes the same element throughout the set of drawings.

FIG. 9.1 through 9.31 are flow diagrams showing the detailed byte-code transformations done on classes in an implementation of the present invention as well as showing how the modified byte-code behaves during execution of a system using the present invention.

DETAILED DESCRIPTION OF THE INVENTION

As indicated above, the present invention provides a system, method and program product for non-blocking dynamic update of statically-typed class-based object-oriented software, executing in a virtual machine on an actively running desktop, server, mainframe or embedded computing device. Specifically, the present invention provides dynamic update by performing transformation on the byte-code of class definitions that enables them to be updated dynamically. Updating of classes takes effect at the granularity level of modules. Changes that do not break module API compatibility with previous running versions have no impact beyond the module itself. The ones that violate the binary compatibility rules [2] expand the update set to also include new API compatible module versions for all running dependents. Changes during updating may include; changing method bodies, adding/removing methods, adding/removing constructors, adding/removing fields, adding/removing classes, changing interfaces, replacing superclass, adding/removing implemented interfaces, and transparent object state migration, while ensuring type-safety of the update class definitions and its co existing dependent in different versions of the running software.

In general, the approach supports unanticipated dynamic software evolution of both code and state at the level of classes. Based on commonly accepted guidelines for API evolution, the approach of the present invention allows the same set of state-full updates derived from a scheme that serializes state before halting the system and de-serializes after restarting the redeployed system.

As used herein, the term "module" or "software module" means a piece of computer code that is independently loadable from long-term storage media (such as, but not limited to, a disk drive, CD-ROM, tape, etc.). In context of the present invention "Module" implies identifiable collections of class definitions, in the form of byte-code representations, and supplementary application resources. Furthermore, a module will have a well-defined API from which the outside world, namely dependent modules, can reach its public members. A module explicitly declares a dependency on other components.

As used herein, the term "change set" means the set of class definitions that must be atomically redefined together in order to avoid binary incompatibility.

As used herein, the term "type namespace" means the reachable types from a particular context, being one of an object, a class or a module. The reachable types are given by the types which can be loaded directly from within the given context.

Figure 1:
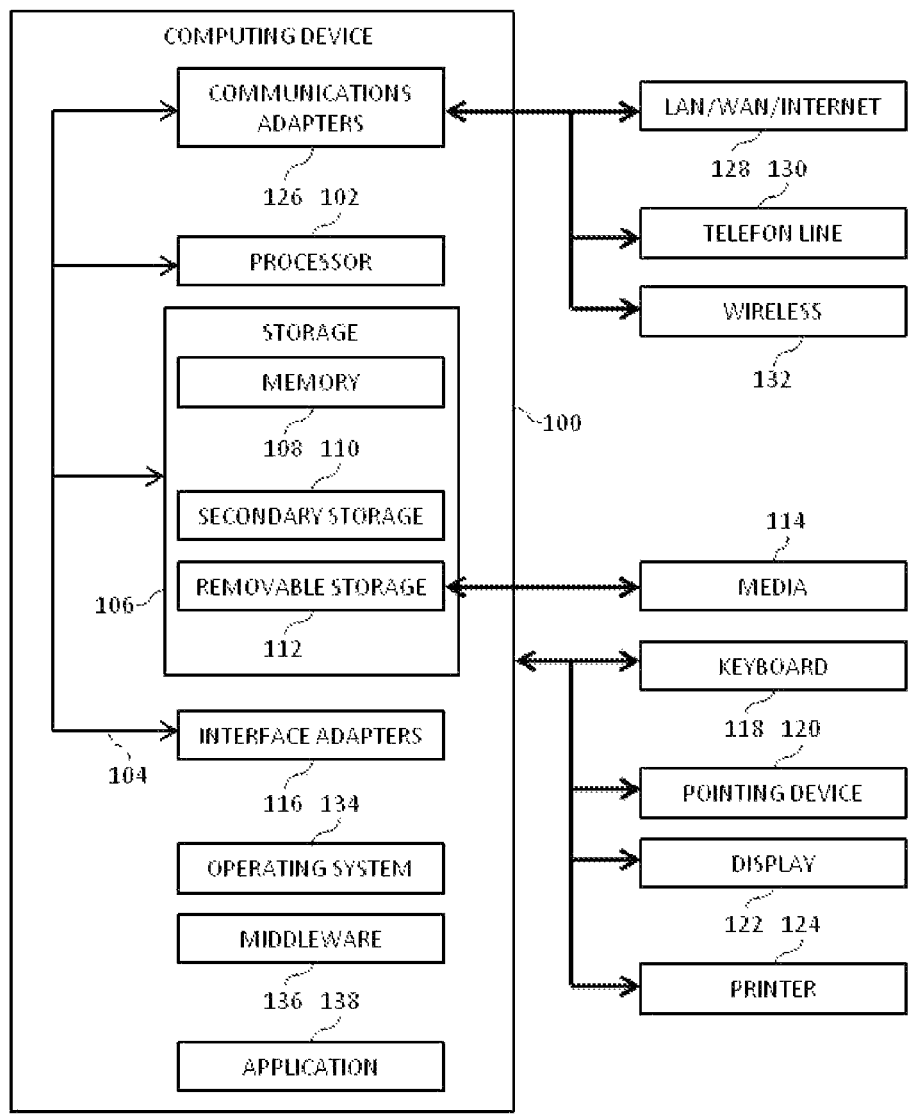
FIG. 1 is a block diagram of a generic computing device, which could be a desktop, workstation, server, mainframe computer, embedded computing device, etc., wherein the present invention may be practiced.

FIG. 1 is a block diagram of a computing device, such as a workstation, wherein the present invention may be practiced. The environment of FIG. 1 comprises a single representative computing device 100, such as a personal computer, workstation, enterprise mainframe computer, server, laptop, handheld computer, information appliance, etc., including related peripheral devices. The computing device 110 includes a microprocessor 102 or equivalent processing capability and a bus 104 to connect and enable communication between the microprocessor 102 and the components of the computing device 100 in accordance with known techniques. Note that in some computing devices there may be multiple processors incorporated therein.

The microprocessor 102 communicates with storage 106 via the bus 104. Memory 108, such as Random Access Memory (RAM), Read Only Memory (ROM), flash memory, etc. is directly accessible while secondary storage device 110, such as a hard disk, and removable storage device 112, such as a floppy diskette drive, CD ROM drive, tape storage, etc. is accessible with additional interface hardware and software as is known and customary in the art. The removable storage device 112 will have associated therewith an appropriate type of removable media 114, such as a diskette, CD, tape reel or cartridge, solid state storage, etc. that will hold computer useable data and is a form of computer useable medium. Note that a computing device 100 may have multiple memories (e.g., RAM and ROM), secondary storage devices, and removable storage devices (e.g., floppy drive and CD ROM drive).

The computing device 100 typically includes a user interface adapter 116 that connects the microprocessor 102 via the bus 104 to one or more interface devices, such as a keyboard 118, a mouse or other pointing device 120, a display 122 (such as a CRT monitor, LCD screen, etc.), a printer 124, or any other user interface device, such as a touch sensitive screen, digitized entry pad, etc. Note that the computing device 100 may use multiple user interface adapters in order to make the necessary connections with the user interface devices.

The computing device 100 may also communicate with other computing devices, computers, workstations, etc. or networks thereof through a communications adapter 126, such as a telephone, cable, or wireless modem, ISDN Adapter, DSL adapter, Local Area Network (LAN) adapter, or other communications channel. This gives the computing device direct access to networks 128 (LANs, Wide Area Networks (WANs), the Internet, etc.), telephone lines 130 that may be used to access other networks or computers, wireless networks 132, such cellular telephone networks, and other communication mechanisms. Note that the computing device 100 may use multiple communication adapters for making the necessary communication connections (e.g., a telephone modem card and a Cellular Digital Packet Data (CDPD). The computing device 100 may be associated with other computing devices in a LAN or WAN, or the computing device can be a client or server in a client/server arrangement with another computer, etc. All these configurations, as well as the appropriate communications hardware and software, are known in the art.

The computing device 100 provides the facility for running software, such as Operating System software 134, Middleware software 136, and Application software 138. Note that such software executes tasks and may communicate with various software components on this and other computing devices.

As will be understood by one of ordinary skill in the art, computer programs such as that described herein (including Operating System software 134, Middleware software 136, and/or Application software 138) are typically distributed as part of a computer program product that has a computer useable media or medium containing or storing the program code. Therefore, "media", "medium", "computer useable medium", or "computer useable media", as used herein, may include a computer memory (RAM and/or ROM), a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD Rom, diskette, hard drive and the like, as well as other non-palpable physical media, such as a carrier signal, whether over wires or wireless, when the program is distributed electronically. Note also that "servlets" or "applets" according to JAVA technology available from Sun Microsystems of Mountain View, Calif., would be considered computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "embodied on" a medium is intended to encompass the above and all equivalent ways in which the instructions or software can be associated with a computer useable medium.

For simplicity, the term "computer program product" is used to refer to a computer useable medium, as defined above, which bears or has embodied thereon any form of software or instructions to enable a computer system (or multiple cooperating systems) to operate according to the above-identified invention.

It will be likewise appreciated that the computer hardware upon which the invention is effected contains one or more processors, operating together, substantially independently, or distributed over a network, and further includes memory for storing the instructions and calculations necessary to perform the invention.

Those skilled in the art will recognize that a system according to the present invention may be created in a variety of different ways known in the art. For example, a general purpose computing device as described in FIG. 1 may be configured with appropriate software so that the computing device functions as described hereafter. Furthermore, discrete electronic components may be used to create a system that implements all or part of the functionality. Finally, note that combinations of multiple computing devices running appropriate software or discrete electrical components can be used in like fashion. Essentially, the hardware is configured (whether by software, custom designed, etc.) to perform the functional elements making up the present invention.

Figure 2:
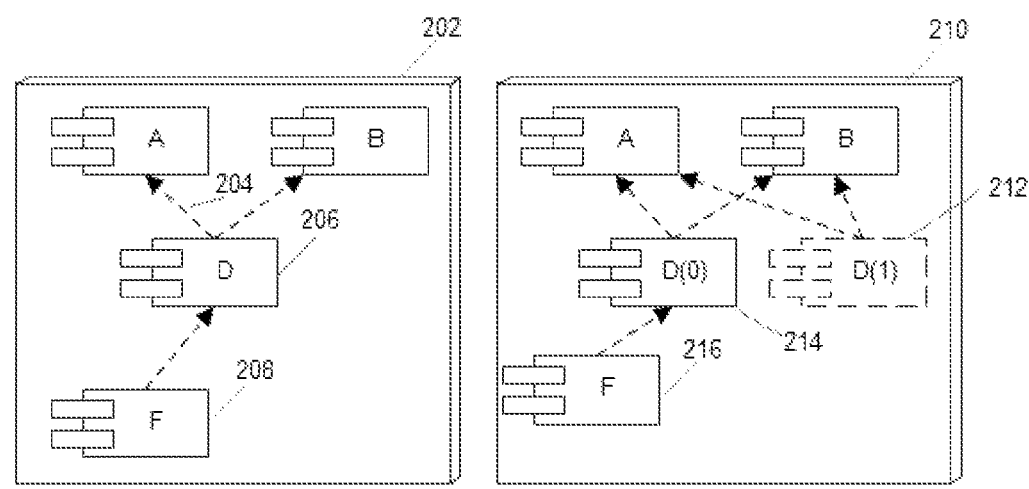
FIG. 2 shows an example system snapshot where modules in a system are linked according to their dependencies.
Figure 2:
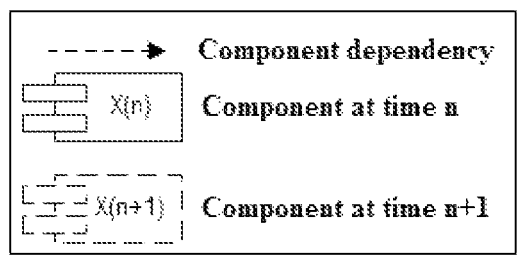

FIG. 2 is a diagram showing an example system setup that is built out of a number of components 206. Initially, depicted by 202, the system at time t=0 shows typical bindings of components within the system, reflecting the fact that classes in 208 can use classes in 206. At runtime, these bindings are maintained by the class loaders in the running system. The present invention is based on the knowledge of the typical class-loader setup in modern programming languages executed by a Virtual Machine. Typically, every module is assigned to a distinct class loader solely responsible for loading classes and resources explicitly declared by that module. A class load of a class declared in a module dependency, 204, consists of finding the associated class loader and delegate the class load to that class loader. This broadly applied scheme results in a unique representation of each class, which makes type sharing between different modules straightforward. However, in context of dynamic replacement of classes defined by modules, a question arises: How do modules reach classes declared in a newer version of their module dependencies? In lieu of built-in support for class reloading, a new class loader must be assigned with each replaced component, 212. From a virtual machine point of view, a new set of distinct types are thereby created.

Referring now to 210, associating new class loaders with replaced modules is problematic as client modules are statically bound to the former version of the updated module. To clarify, if a class declared by 216, uses the class A declared by 214, then updating 214 will create a new type A, which is not assignment compatible with the original type A. Therefore, an attempt to alter the class-loading delegation scheme dynamically to let the class loader associated with 216, delegate to module 212 will not succeed. As an example: A case where client classes have already been linked with classes in module 216 using the new type will result in class-cast exceptions and linkage errors. Nonetheless, the present invention provides a dynamic update framework that resolves the issues from the setup shown in FIG. 1. Moreover, it successfully handles all type-related issues originated from the version barrier [1], entailing that module communication across the version barrier can happen seamlessly within the current semantics of, for instance, the Java programming language.

To ease the understanding of the technical descriptions, the following notations apply throughout the remainder of this paper. A target component denotes the most recent version of a running component. In consecutive updates of a component, we use the term former component to refer to any of the components but the target. At update time, the terms current target and new target are used when referring to the target component before and after the update, respectively. The term intermediate component is used to refer a particular component version between the target and some former component.

As an example, consider four versions of Component A: A1, A2, A3 and A4. In this case, A4 is the target and all others are former components. Components A2 and A3 are intermediates relative to A1, and A3 is an intermediate relative to A2. Furthermore, a component is associated (if appropriate to the given explanation) with a time of the update which is noted on the form A(n) also used already by 214 and 216. Timings are always represented as a linear sequence of equidistant real numbers even though the time difference between updates varies. Moreover, any two components that represent two versions of the same initially deployed component are mentioned as correspondent components. In addition to these time-related terms, any user-specific component built on top of the component platform itself is said to be an updateable component. At the class level of an updateable system we use the term updateable class to describe a class that has been declared in an updateable component.

A basic concept of the dynamic update approach disclosed by the present invention is the In-Place Proxification technique. It is the glue between a former component and the target. The In-Place Proxification mechanism provides a novel solution to the problem of introducing an indirection between two component versions. Where existing indirection mechanisms adopt a variant of the generic wrapper concept [4], which places code for redirecting calls from the old version to the new version around the old component, the In-Place Proxification mechanism uses in-place-generated code to provide the level of indirection to a newer version within the code of the old component. Hence redirection is moved from the outside to the inside, which solves a number of the problems faced by existing approaches based on the generic wrapper concept. The main idea is to generate a component-level switch to enable proxy behavior inside the code of components.

Figure 3:
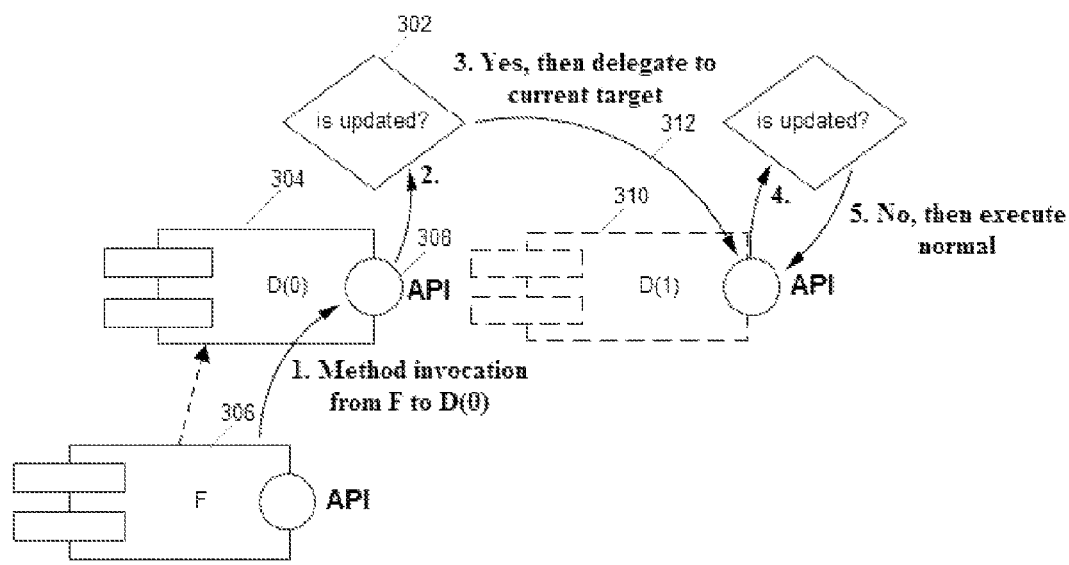
FIG. 3. shows a conceptual overview of the In-Place Proxification technique.

FIG. 3 is an illustration of how incoming requests to 304 are intercepted by the component API depicted by 308 and forwarded to 310. This forwarding cannot happen through direct communication as it will cross the version barrier that rises due to the creation of a new and distinct namespace in 310. For that reason, we use the reflective techniques to communicate from former components to the target. However, reflection does not provide a complete solution to the problem at hand, as the formal parameter types and the return type in a forwarded method invocation may be incompatible with the types known by the former component. In general, the prerequisites described below apply to a method declared in an updateable class for successful forwarding.

Every updateable class needs to know about the target class. Therefore, the present example system implementing the present invention generates a static field of type java.lang.Class in every application class just before it is loaded. The field is set on first usage after every update of the declaring component.

Figure 4:
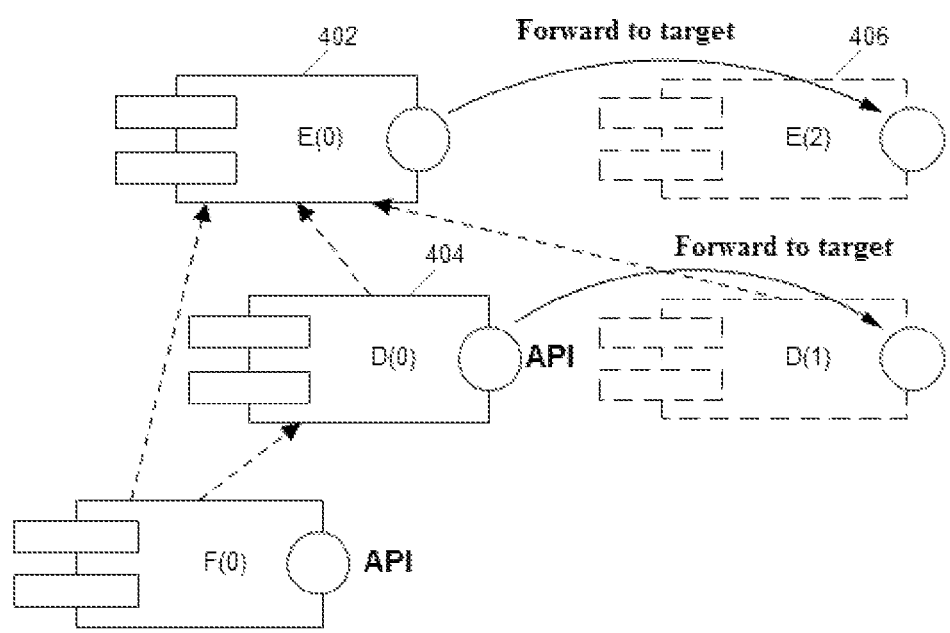
FIG. 4. shows an example of module bindings after successful updates of involved components.

FIG. 4 shows an example system snapshot after a component update has been applied to 402 and afterwards 404. Finding the correct target method in this case is troublesome because updateable formal parameter types are not necessarily type-compatible with the ones in the calling method. Therefore, the correct types must be looked up so that they match the formal types of the target method. Now, if a method, say m, declared in component D uses a component E type class as a formal parameter type, this type would not comply with the namespace of the target component E, namely 406. Therefore, a type in the namespace of 402 should be used to look up this method. The only reasonable option to obtain the correct type version, regardless of origin, is to ask the associated class loader of the target class which delegates to known class loaders only. Asking class loaders for classes, each time a method invocation happens, introduces unacceptable overhead. It would force executing the class-loading algorithm for each updatable formal parameter type in each method invocation. This is why the present invention caches already looked up methods directly in the declaring class. In addition, it maintains an already-loaded-class cache for each updateable component.

In case of a static method, the target class and method are sufficient to support method forwarding. However, in an instance-method invocation, the method must determine the object of which the invocation should be forwarded to. A reference to this target object is kept in every instance of an updateable class by a code-generated instance field of a special marker type. By means of byte-code transformations the marker type is implemented by all updateable classes. We denote the term target information for all of the above-mentioned targets, namely: target component, class, method and object. However, the term is context dependent in the sense that in a static method context the target information consists of the target component, class and method only.

Finding the correct parameters to forward to the target method is identical to determining the target object in the first place. Parameters must represent the same entity in the system regardless of version. Therefore, the actual parameters delivered to the target method can be a combination of In-Place Proxies and target objects according to what types are understood by the target class.

Figure 5:
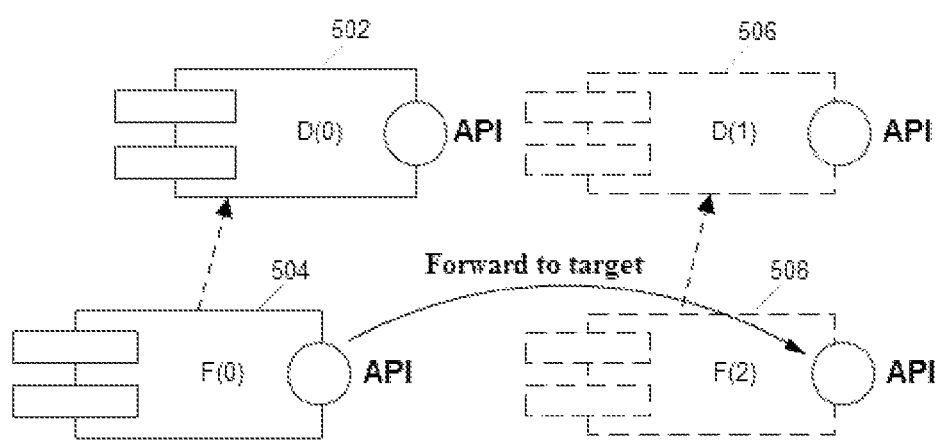
FIG. 5 shows an example of module bindings after performing dynamic updates of clients in order to link with the updated module dependencies.

FIG. 5 shows an example snapshot of module bindings after a dynamic update of 502 and afterwards a dynamic update of 504. Besides evolution of method bodies, the present invention also allows dynamic evolution of the class interface and the type hierarchies. Changes that affect the type of an API class become directly visible to a client component at the time of an update of the client. This is achieved by letting the class loader associated with the new version, 508, of the client component directly delegate its class loading to target components of its component dependencies, 506.

The setup shown in FIG. 5 also reveals another very important property of the present invention with respect to the overall performance. Clearly, the forwarding of API methods in accordance with the mentioned prerequisites poses a relatively large performance penalty. This is mainly caused by the introduced reflective behavior. However, once the clients have been compiled against the updated component API and then dynamically bound to the new target component, these invocations will again happen directly to the target method. Hence, method invocation speed returns to the speed before the update.

While the In-Place Proxification technique of the previous section enables communication across class-loader boundaries, it does not maintain program consistency by itself. As explained above there are type-related problems involved in the forwarding that need to be handled to support correct execution flow. The framework must ensure that any live object in a particular target component is represented by either zero or one object in every corresponding former component (zero because corresponding objects are created on demand only). For example, running a normal constructor in a target component does not trigger the creation of any other objects in former versions at that point. Only if a target object is returned through an In-Place Proxy method, a corresponding object is constructed and returned in its place. This corresponding object is preconfigured to forward all future method invocations to the target object from which it was created. In order to guarantee that correct objects are always returned, the present invention provides a registry in which objects are paired in accordance with its live representation.

The present invention handles correspondence between multiple representations of objects by a technique named Correspondence Handling.

At update, time the behavior of all classes and objects of the updated component become In-Place Proxies by altering a runtime switch of the updated component. On the first usage, the injected In-Place Proxy code triggers a construction of a corresponding uninitialized object from the class definition declared by the new target component and adds these pairs into the appropriate correspondence map. Furthermore, this triggers the initialization of the target object and class field which is set to point to the corresponding representations of the new target component. At this point, an uninitialized object indicates that no state of the former object has been migrated to the new target object. State migration happens lazily on the first usage of individual fields.

The above-mentioned scenario describes how corresponding objects are created and handled for already present objects in the running system. Clients can continue to create objects of former components after the update took place. In this case, constructors forward to the corresponding constructor in the target component just as method invocations do. Although this will in principle execute two constructors, a user-written constructor body only runs in the target constructor. In addition, the two corresponding objects coming from such object constructions are mapped in accordance to the aforementioned Correspondence Handling.

Another important issue is to guarantee that any method invocation across component boundaries only goes through one level of indirection via an In-Place Proxy. Suppose a component has been updated twice and its objects go through the In-Place Proxification process two times. Then, when a client of the first version invokes a method, it will go through an intermediate component to get to the object in the target component. To guarantee one level of indirection, an In-Place Proxy class maintains a static forward reference to its last known target component. Eventually, this target is updated and its runtime component switch is changed to enable forwarding in its declared classes. This makes the forward reference held by the initial component point towards an intermediate component, which is not desirable. Therefore, a simple check of the present knowledge of the target component reveals that a new target component has been installed and the forward reference is updated by the application thread itself just before the forwarding. Furthermore, this meta-information update is reflected in the correspondence handling as well.

State migration is central to dynamic update. Generally, state migration techniques fall into one of two categories: 1) transparent state migration and 2) programmer-influenced state migration. The present invention is based on transparent state migration. In our opinion, transparent state migration is preferable over programmer-influenced state migration since it does not require explicitly written version adaptors or state transfer functions. Writing version adaptors and state transfer functions is a labor-intensive task which is unnecessary for many types of updates. The present invention uses a mechanism that transfers field values of the former component to the target component automatically and transparently.

The mechanism performs state migration lazily on demand. State is migrated from a former component to the target component by application threads on first accesses of fields. This approach preserves standard synchronization semantics as no special locking is required. Hence, deadlocks are not an issue since no threads are stopped temporarily.

After an update, every incoming request ends up in the new target component and, eventually, it will cause state to be transferred from former versions. To achieve this, the approach creates special access methods to handle field reading and writing. The basic idea is to maintain a Boolean value for every field which reflects whether the state is present. Upon class loading and standard constructor invocations, these fields are set to false (default initialization). In this case false reflects that the state is present, because any state is in the initial version at first. In new target classes and objects constructed from former objects, these fields are explicitly set to true. Thereby, it indicates to the associated access methods that the state is not present. In order to transfer the state to the current target classes and objects the inserted access methods look up former corresponding versions until it locates the one holding a false value in its associated Boolean value. Then the field is transferred from the former version to the target and the Boolean values are set to true and false, respectively. The process also depends on the type of the value found as only non-updateable types can be copied by reference. If it is an updateable type the Correspondence Handling locates or creates the correspondent object.

An important property of the present invention is that it supports introduction of new fields in classes. It has just been described how the associated Boolean values of migrated objects have been explicitly set to true. This does not reflect the fact that new field values are actually stored in target classes and objects initially. For that reason, once the special get method is invoked for the first time, it ends up trying to locate the field in a former version. It will discover that this particular field has been added and so correct the Boolean field as if the value was already present. However, new fields cannot automatically be assigned to meaningful values. To circumvent possible null-pointer exceptions or unexpected default primitive values, the present invention supports initialization of field assignments explicitly written at the class level by programmers themselves. For every class-level assignment written by the programmer, the present invention guarantees that a new object created from any former object will hold the values assigned by programmers. This is accomplished through byte-code analysis, which is described in detail hereinbelow.

Having explained how the approach handles binary compatible changes, this section describes how it handles binary incompatible changes. The approach imitates the off-line update scheme requiring update sets that jointly constitute binary compatible components. Thus, the approach also supports updates of component APIs breaking binary compatibility with their previous version. We use the well-known and simple example of adding a parameter to an existing method as an example.

public void createInstance(String name, int ID) {...}
public void createInstance(String name, int ID, String description) {...}

Now, trying to update the component containing the method above may result in broken clients. Therefore, a static dependency verifier locates such incompatible component changes before performing the update. In the example, if the verifier finds a removed API-method change, it then tries to locate updates to client components and checks the compatibility with the updated set of client components. If it does not find any incompatibilities, it carries out the update of the new set of components. Otherwise, it discards the update. Introducing binary incompatible changes thus affects the update ability of the running system by placing requirements on client components. This is a well-known restriction in independently-developed components. The price to pay for breaking a contract, set up by the original version of the component, is the risk that the approach cannot apply the update in all running systems before the implicated programmers invest in updating clients as well. API designers are fully aware of this price. Typically, they take actions to maintain binary compatibility. An example is that they will overload the method in Listing 3, thus maintaining the old API for a number of source-code iterations. We stress that this limitation is exactly what you get from an off-line update scheme, and that it has nothing to do with how the updates are carried out. Any attempt to introduce smarter mechanisms for allowing updates of binary incompatible changes will break programmer transparency.

Figure 6:
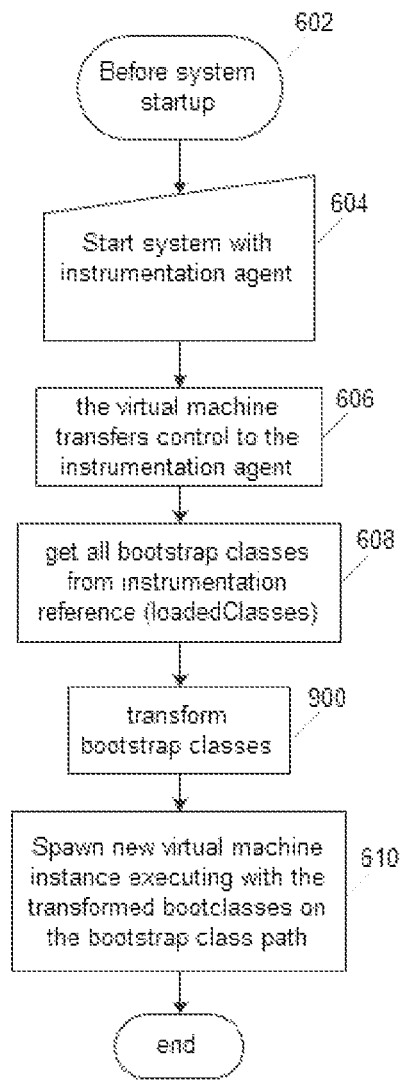
FIG. 6 is a flow diagram showing the high level steps taken in order to carry out the bootstrapping phase of the invention.

FIG. 6 is a flowchart showing a high level representation of the steps required to startup a dynamic update-enabled program instance, initially before system startup, 602. At step 604, the user of the present invention takes actions to execute the computer program wherein the present invention shall be carried out. The user specifies a special agent library which represents the bootstrapping transformation tool. This tool is responsible of transforming the byte-code of the bootstrap classes, classes used by the virtual machine to start up agent libraries. At the point, the execution control is handed over to the agent library, 606. The special agent library determines the set of bootstrap classes by querying the virtual machine of all loaded classes in step 608. Having obtained a reference to all loaded bootstrap classes the transformation process of the byte-code of the found bootstrap classes takes place in step 900, a detailed description of which is given in FIG. 9.1. Subsequent to the transformation process, the special agent library spawns a new computer program instance in 610 which contains the transformed bootstrap classes in addition to a different special transformation agent required to perform the byte-code transformations necessary to carry out the runtime part of the present invention.

Figure 7:
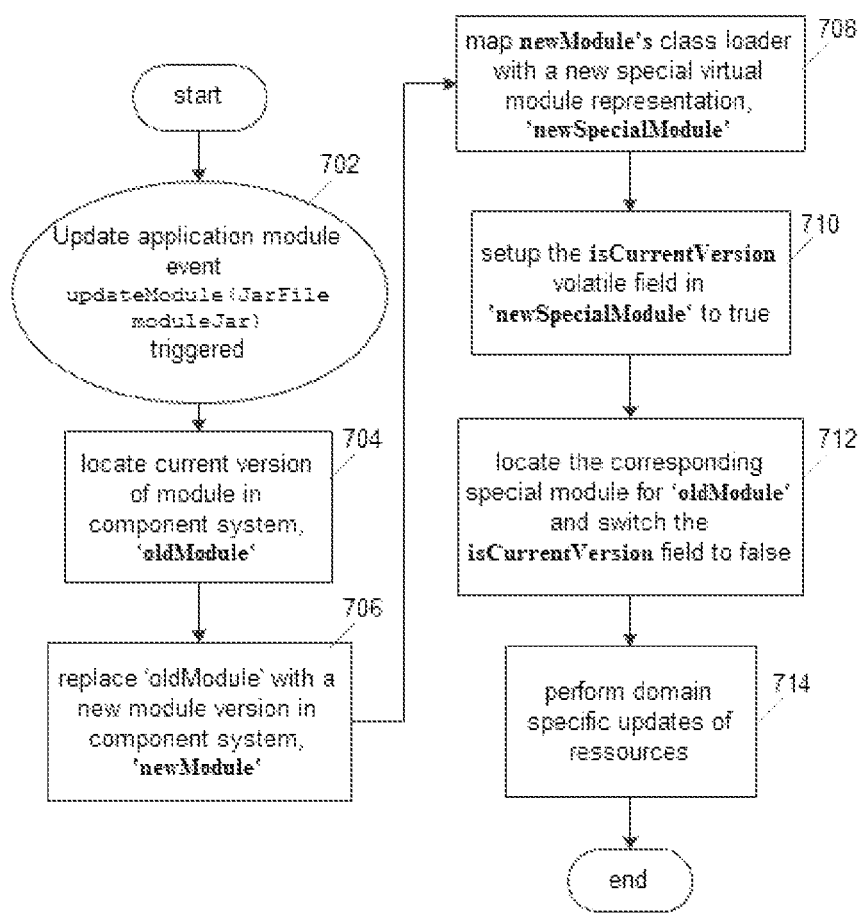
FIG. 7 is a flow diagram showing the high level steps taken to carry out a dynamic update of an actively running module in a computer program.

FIG. 7 is a flowchart showing the steps taken in order to dynamically update a module in an actively running system. Initially, at 702 the flow of events is triggered by a request to update a module in the currently running system. The origin of the dynamic update request can be anything that can communicate with the present invention depending on the particular embodiment of the present invention. Having initiated the dynamic update process the most recent version of the module currently running module is located in step 704. The dynamic update process then installs the new module in the component system enhanced in the particular embodiment of the present invention, 706. The newly created component is then associated with a likewise newly created virtual module in 708. Such virtual modules represent the specific version of the real component installed in the component system. They function as the glue between corresponding module versions as they have built-in mechanisms to retrieve corresponding objects and classes on-demand from their own unique type namespace. To exemplify: in an In-Place Proxy method invocation as the one in 312, if a parameter of the method belongs to the type namespace of 304 then it must be converted to the corresponding type namespace of 310. Now before delegation of 312 can take place the virtual module associated with 310 is queried for a corresponding object to that of the original parameter value given in the method intercepted in 304. If such a corresponding object exists it is retrieved immediately, otherwise created as an un-initialized object as described above. Returning to FIG. 7, after associating the real component to the virtual module, the runtime switch in the new virtual module, is setup initially to ensure that objects and classes constructed and loaded respectively in the unique type namespace of the associated component do not delegate, 710.

The dynamic update of the previous installed module happens in 712 where the runtime switch is used to make any object and class a surrogate for possible future corresponding representations in the newly installed module. Finally, in 714, domain specific updates of resources of particular elements in the component system enhanced in the particular embodiment of the present invention are performed.

Figure 8:
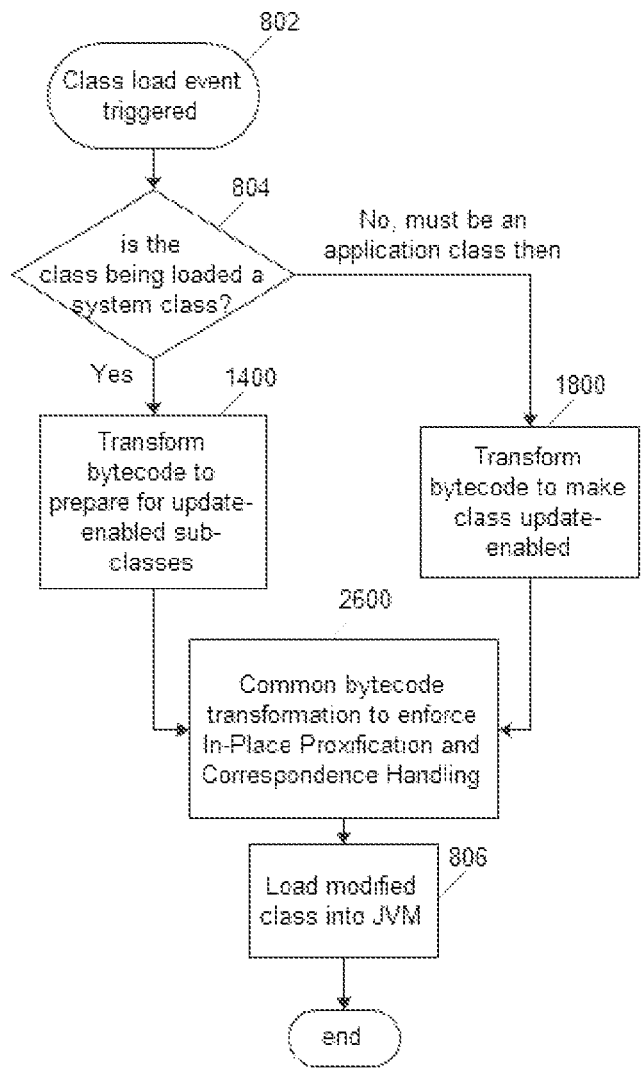
FIG. 8 is a flow diagram showing the high level steps taken in order to transform the byte-code of classes just before they are loaded into the virtual machine.

FIG. 8 is a flowchart depicting the steps taken to transform classes on-demand during execution of an embodiment of the present invention. Initially, at 802 a class-load event is triggered to load a class into the virtual machine executing the running system. In step 804, the transformation agent determines whether the class is a system class or an application class. Here a class is categorized in terms of its class loader. An application class is loaded by a component class loader of the underlying component system and a system class by the system class loader. The high level process steps shown in 1400 and 1800 to transform system classes and application classes respectively are detailed while referring to the finer grained view represented by FIG. 9.6 and FIG. 9.10. Likewise, the high level transformation step shown as 2600 to perform further byte-code modifications on all classes in the system regardless of their class loader is comprehensively described when referring to FIG. 9.16. Once all byte-code transformations have completed the modified class is loaded into the virtual machine in 806.

FIG. 9.1 is a flowchart showing the steps taken to transform the byte-code of bootstrap classes. The flow is triggered by the bootstrap process to transform the byte-code of every bootstrap class 902. Hence the process depicted by this flowchart is repeated for every bootstrap class. In 904 those classes among the bootstrap classes that requires special handling to fulfill a certain property of the present invention is filtered out. If the decision in 904 yields true the steps taken to transform those special classes is handled by a separate process further detailed in FIG. 9.3 (1100). For each non-special bootstrap class, the byte-code is transformed by 1) storing information about bootstrap fields in 906, 2) iterating through methods and constructors, 908, transforming the code according to whether they are object finalizers 1100, constructors 1200, public or protected methods 1300. Finally, the high level process of performing byte-code replacements and other special byte-code instruction handling is captured by 2600, which is detailed while referring to FIG. 9.16.

FIG. 9.2 is a flowchart depicting the steps taken to perform byte-code transformations of the special bootstrap classes found in 900. This example embodiment of the present invention replaces the byte-code of certain methods in these special classes to ensure that the usage of reflective mechanisms corresponds to the In-Place Proxification and Correspondence Handling model described above. At 1004, the process branches to 1006 if the special class to be transformed is the java.lang.Class class. The process then searches for the methods named getDeclaredMethod or getDeclaredField in 1008. In these methods byte-code is inserted at the beginning of the method to check if the field or method searched for is added by the present invention, 1014. If so, byte-code is added to throw a runtime exception in 1016. Coming back to 1008, in case the method in java.lang.Class is one of getDeclaredField or getDeclaredMethod, the process branches to 1010 in which case byte-code is added in 1012 to invoke a special filter method to cut out any method or field added by the present invention before returning the list of declared methods and fields respectively. Looking again at 1004 in case of following the 'no' branch, the process looks for the java.lang.reflect. Field class in 1018. In case this class is found, the specific method named getFieldAccessor is located in 1020, and byte-code is inserted in step 1024 at the beginning of this method to return a custom-made field accessor that complies with the field access model of the present invention as described above. Likewise, for the last special class, java.reflect.ReflectionFactory, step 1022 locates a special method where the byte-code transformation in step 1024 is inserted at the beginning of the method.

FIG. 9.3 is a flowchart showing the steps required to make sure that the original code of a finalize method is executed on the latest version of the specific object only. The byte-code transformations insert byte-code at the beginning of finalizer methods, 1102. The inserted byte-code first checks if the object in which the finalize method is executed on is declared in an update-enabled application class, 1104. If so, it further checks if the object is the latest version of the object in accordance to the Correspondence Handling described above, 1106. In that case the original method body of this finalize method is executed, 1108. Returning to 1104, if the object currently being finalized is not an instance of an update-enabled application class, the original method body is also executed, 1108. In case the object is not the latest version in step 1106, the transformation process inserts byte-code to return immediately without executing the original method body, 1110. The reason for excluding the original finalize code upon object finalization is that the latest corresponding object of the present object is currently live in the system. Hence, any possible side-effects coming from the clean-up of the finalize method may have unwanted semantic impact on the running system.

FIG. 9.4 is a flowchart showing the steps taken to guarantee that the original code of a constructor is executed on the latest version of the specific object only. The byte-code transformations insert byte-code at the beginning of constructors, 1202. The inserted byte-code first check if the object in which the constructor is executed on is declared in an update-enabled application class, 1204. If so, it further checks if the object is the latest version of the object in accordance to the Correspondence Handling described above, 1206. In that case the original method body of this constructor is executed, 1208. Returning to 1204 if the object currently being constructed is not an instance of an update-enabled application class, the original constructor is executed, 1208. In case the object is not the latest version in step 1206, the transformation process inserts byte-code to return immediately without executing the original method body, 1210. This situation commonly occurs if a client of an updated class constructs an object of that class. The mandatory chaining of constructors in class hierarchies forces the first byte-code instructions to be an invocation to the super constructor. Thus, even though the inserted byte-code can reason about whether or not an object is the latest version it cannot omit the super constructor call. Therefore, when entering the super constructor in the example described the object being created is not the latest version, resulting in a constructor delegation handled by the In-Place Proxificated sub-class.

FIG. 9.5 is a flowchart showing the steps taken to insert byte-code at the beginning of a method, 1302 to make sure that the execution of a programmer-written method body always happens in the latest version of the executing object. The inserted byte-code first checks if the object in which the method is executed on is declared in an update-enabled application class, 1304. If so, it further checks if the object is the latest version of the object in accordance to the Correspondence Handling described above, 1306. In that case the original method body is executed, 1308. Returning to 1304, if the object currently executing the method is not an instance of an update-enabled application class, the original method body is executed, 1308. In case the object is not the latest version in step 1306, the transformation process inserts byte-code to invoke a method responsible of looking up the most recent corresponding version of the currently executing object 1310. Having obtained the most recent corresponding version the original method invocation is delegated in step 1312 to the corresponding method in the target class.

FIG. 9.6 is a flowchart showing how system classes are transformed when they are loaded, 1402. Before loading the system class into the virtual machine the byte-code is parsed, 1404. During the parsing of the class, two special accessor methods are created for reading and writing non-static fields in the class as shown by 1406. A detailed description of the generation of these methods is given when referring to FIG. 9.7 (1500) and FIG. 9.8 (1600) respectively. Step 1408 determines if the class is declared as a final class. In other cases the flow goes through step 1700, which depicts that some helper methods need to be generated inside this class in order for possible update-enabled sub classes to make use of them, before going to 1410. Further description of this generation is given when referring to FIG. 9.9 (1700). Coming back to 1408, in case the class is not final the process iterates through methods and constructors in 1410, transforming the code according to whether they are object finalizers 1100 (FIG. 9.3), constructors 1200 (FIG. 9.4), or public or protected methods 1300 (FIG. 9.4). Finally, the high level process of performing byte-code replacement and other special byte-code instruction handling is captured by 2600 (FIG. 9.16).

FIG. 9.7 is a flowchart showing the steps taken to generate field read methods for non-static field access in system classes, 1502. Initially, in 1504 the stub for the generated method is created. Next, in 1506 the process branches on final classes for which byte-code to read the field value directly is inserted into the generated method in 1508. This optimization is possible since for a final class there can be no sub classes. Thus, no In-Place Proxy objects can be created from a class hierarchy containing the processed system class, ensuring safe direct field access for the fields in the processed system class. For classes not declared as final the process inserts byte-code into the generated method to check if the owner object of the field is update-enabled in 1510. If so, the object is cast to the special update-enabled marker interface in 1512. This special interface is implemented for every application by means of byte-code transformations as described below. In 1514, a special method implemented by the present embodiment of the invention is used to replace the currently executing object with the "origin object". An origin object is defined as an object created by executing a standard constructor. In contrast, any corresponding object created by the present embodiment is therefore not an origin object. The field is read from the origin object by casting it to the declaring class type in 1516, reading the field value in 1518 and returned to the caller of the original field read instruction by inserting the appropriate return instruction depending on the type of the field in 1520.

FIG. 9.8 is a flowchart showing the steps taken to generate field write methods for non-static field access in system classes, 1602. Initially, in 1604 the stub for the generated method is created. Next, in 1606 the process branches on final classes for which byte-code to write the field value directly is inserted into the generated method in 1608. For classes not declared as final, the process inserts byte-code into the generated method to check if the owner object of the field is update-enabled in 1610. If so, the object is cast to the special update-enabled marker interface in 1612. In 1614, the process inserts byte-code to obtain a reference to the origin object as described above. The field is written to the origin object by casting it to the declaring class type in 1616, loading the value from the parameter to the generated method in 1618 and writing the loaded value into the origin object in 1620.

FIG. 9.9 is a flowchart showing the generation of certain helper methods in system classes, 1702. These methods are convenience methods for ending the recursive super calls, used to determine certain properties about the target information as described above in the class hierarchy for update-enabled classes. In step 1704, the generation processes whether the method previously generated is the special isMethodPresent method. In that case, the byte-code inserted into the generated method always returns true, 1706. For the other generated method, the byte-code inserted always returns false, 1708.

FIG. 9.10 is a flowchart depicting a high level view of the steps taken to parse 1804 and transform the byte-code of an application class before loading the class, as initiated in 1802, into the virtual machine. In 1806, the transformation process inserts the aforementioned update-enabled marker interface implemented by all application classes in the system. Step 1808 depicts the high-level view of the process that generates field accessor methods for each field in the application class, the detailed description of which follows in FIG. 9.11 and FIG. 9.12. Step 2100 shows the high level view of the process of generating byte-code to initialize fields introduced by updates to the former versions of this class. The detailed description of this process is in FIG. 9.13. Every member declared by the class being transformed, 1810, goes through a specialized transformation according to whether it is a finalize method, 1812 a constructor, 1814, a static initializer (<<clinit>>), 1816, a non-static public or protected method, 1818 or a static public or protected method, 1820, of which each individual transformation is comprehensively described in FIG. 9.3 (1100), FIG. 9.14 (2200), FIG. 9.15 (2300), FIG. 9.16 (2400) and FIG. 9.17 (2500) respectively.

FIG. 9.11 is a flowchart showing the steps taken to generate the field read method in application classes, 1902. The byte-code inserted into the field read method initially checks if the currently executing object is the current version in 1904. If so, it further checks to see if the field value is present in this version of the object in 1906. The present embodiment of the invention associates an array of Boolean values each of which holds the answer to the question raised in 1906 for the individual fields of the declaring class. If the state is present the field value is read and stored in a local variable in step 1908. Afterwards, a check to see if an update of the declaring class has happened in the time period between 1906 and 1910, is performed. In case such an update has occurred, the field read request is delegated to the current target version as shown in 1914, which would also be the resulting event in case the object owner had been updated in the first place while checking the condition in 1904. Coming back to 1906, in case the current version of the field state is held in a corresponding version of the owner object, a method migrating the state from its present location is invoked in 1916. This invocation happens under a special lock-mechanism as shown in 1918 designed with capabilities to synchronize across corresponding objects. Thus, while the algorithm for reading and writing field values are lock-free and hence fast, the state migration process requires special locking while moving the state from an In-Place-Proxy object to the most recent corresponding version.

FIG. 9.12 is a flowchart showing the steps taken to generate the field write method in application classes, 2002. The byte-code inserted into the field write method initially checks if the currently executing object is the current version in 2004. If so, it further checks to see if the field value is present in this version of the object in 2006. If the state is present the field value is written in step 2008. Afterwards, in 2010, a check, to see if an update of the declaring class has happened in the time period between 2006 and 2010, is performed. In case such an update has occurred, the field write request is delegated to the current target version as shown in 2012, which would also be the resulting event in case the object owner had been updated in the first place while checking the condition in 2004. Coming back to 2006, in case the current version of the field state is held in a corresponding version of the owner object, the field value is written directly in 2014 and the associated Boolean value updated accordingly in 2016. In order to remove the temporary inconsistency introduced in which two corresponding objects explicitly state to hold the most recent version of the field value, a special clear state method is invoked that locates the previous owner of the field value and clears the value itself as well as the associated Boolean value in 2018. The process of updating the Boolean values for the present object owner as well as the previous owner requires the locking mechanism described above as also shown in 2020. The process of removing the state in previous versions of a specific field value does not by itself ensure correct semantic of concurrent access to that field. This is why the extra check to see if updates of the declaring class shown in 2010 and 1910 is necessary.

FIG. 9.13 is a flowchart depicting the steps necessary to assign programmer-written default field values for newly added fields to objects constructed from former versions of the declaring class. In order to capture the byte-code matching the programmer-written field assignments, the byte-code of a constructor is parsed in 2102. A precondition for the parsed constructor is that it cannot be one that delegates the construction to another constructor in the declaring class, in which case the class-level field assignments will not be present in the code of the constructor. Step 2104 contains a check to determine if the declaring class is the first version loaded into the virtual machine. In this case, the process ends without any byte-code generation, since corresponding objects in former versions cannot exist given that a corresponding declaring class has not been loaded. In contrast, if the parsed class has corresponding former class versions, the process goes to 2106, where the first instructions to accomplish the mandatory super constructor invocation is skipped. In step 2108 a declaration of a byte-code block in which byte-code instructions can be stored while parsing. Then in step 2110 the byte-code instructions begin by reading the next instruction in the constructor. The first stop criterion of the algorithm shown in 2112 is whether the instruction is a PUT-FIELD, thus an assignment to a field value in the declaring class. In case the instruction is anything but a PUTFIELD instruction, the test in 2118 checks to see if the current instruction is valid at the class level. A valid instruction at the class level is one that can be used outside a constructor as part of a field initialization assignment. For instance, loading the first parameter of the parsed constructor cannot be made outside the constructor and thus the process stops the parsing. It then moves to step 2116 which generates the method with the byte-code blocks found before the stop criterion was effectuated. Coming back to 2118, in case the instruction can be made at the class level, the instruction is stored in the current byte-code block and the next instruction is parsed in 2110. Looking again at 2112, if the instruction is a PUT-FIELD instruction the algorithm branches to 2114 which captures if the field name contained in the PUTFIELD instruction has already been handled. If so, the algorithm stops and goes to step 2116. If the field name is new, the instruction added to the current block and the block is stored.

A new byte-code block is then initialized in step 2108 and the algorithm continues as described above from step 2110.

FIG. 9.14 is a flowchart showing the byte-code transformations for constructors in update-enabled application classes. The transformation inserts byte-code at the beginning of the method, 2202. The inserted byte-code starts by checking if the declaring class is the most recent version in 2204. If so, the inserted byte-code checks if the object currently being constructed is also the most recent version in 2206. Even though the declaring class is the most recent class version, the object can be an instance of an updated sub-class and therefore step 2206 is required. In case the object is likewise the most recent version, the original constructor body is executed, as shown in 2208, constructing the object as if the inserted byte-code had not been there. Coming back to the test made in 2204 and 2206, if one of these tests yields that the object or class is not the current version the flow continues at 2210. In this scenario, the inserted byte-code needs to determine whether the construction should be delegated to the most recent class version or if any possible sub-class will handle the delegation process after returning from the mandatory super constructor call. Therefore, it is checked in step 2210 if the object being created is an instance of a sub-class, in which case the constructor is returned immediately in 2212. In case the delegation process should be effectuated in the present class, 2214 decides whether or not the current meta-information available is up-to-date. If so, the delegation takes place in 2216, and if not the target information is brought up-to-date in 2218 before going into 2216.

FIG. 9.15 is a flowchart showing the steps taken to transform a static initializer in the present embodiment of the invention. The byte-code will be inserted at the beginning of the method as shown in 2302. In step 2304, a special class registration process is inserted to obtain a reference to the special module associated with the class' component in the system. This reference is used by the inserted byte-code throughout the exemplary embodiment to test to see if classes and objects have been updated. In step 2306, the inserted byte-code decides if the class is the first version loaded into the virtual machine. If so, the original code in the class initializer is executed in 2308. If not the method is returned immediately in 2310 to disallow re-running class initializers with possible incomprehensive side effects.

FIG. 9.16 is a flowchart showing the byte-code transformations for public and protected instance methods in update-enabled application classes. The transformation inserts byte-code at the beginning of the method, 2402. The inserted byte-code begins by testing if the executing object is the most recent version in 2404, in which case the original method body is executed as shown in 2406. In case the executing object is not the most recent version, the meta information is checked in 2408 to see if it is up-to-date in order to successfully delegate the method to the current target method in 2410. If the target pointer is not up-to-date, the flow goes to 2412 where the new target method is looked up. In case the corresponding method has been removed by the dynamic update, as tested for in 2414, the inserted byte-code falls back to execute the present version of the method. Otherwise the delegation process is carried out, of which detailed descriptions of the execution flow is later depicted in FIG. 9.15 (3300).

FIG. 9.17 is a flowchart showing the byte-code transformations for public and protected static methods in update-enabled application classes. The transformation inserts byte-code at the beginning of the method, 2502. The inserted byte-code begins by testing if the declaring class is the most recent version in 2504, in which case the original method body is executed as shown in 2506. In case the executing object is not the most recent version, the meta information is checked in 2508 to see if it is up-to-date in order to successfully delegate the method to the current target method in 2510. If the target pointer is not up-to-date, the flow goes to 2512 where the new target method is looked up. In case the corresponding method has been removed by the dynamic update, as tested for in 2514, the inserted byte-code falls back to execute the present version of the method. Otherwise the delegation process is carried out, of which detailed descriptions of the execution flow is later depicted in FIG. 9.25 (3300).

FIG. 9.18 is a flowchart showing the byte-code transformations done on every class in the system by parsing all byte-code instructions, 2602, inside classes to capture the instructions that require special handling in order to ensure the model behind the invention as described above. Step 2604 filters out byte-code instructions performing object identity tests replacing those with invocations to a special method detailed later by FIG. 9.24 (3200). The Boolean result returned by that method is then checked by inserting a simple comparison of primitive values in 2608. In case the byte-code instruction is a method instruction as tested in 2610, the method instruction is replaced by a special handler method if and only if the method is a special method as checked for in 2612 and further specified by the associated annotation of 2612. If the method instruction is an invocation to the clone method, the original byte-code is transformed according to the detailed description given when referring to FIG. 9.19 (2700). In case the method instruction is related to the built-in synchronization mechanism of the underlying language, exemplified by Java in the exemplary embodiment, those byte-code instructions are transformed in accordance with the process depicted in FIG. 9.20 (2800). The last group of byte-instructions that are intercepted is the one related to arrays as tested by 2622. Any array read, write or query of an array length is replaced by special method invocations, as shown by 2624, which handle the access across corresponding objects. The execution flow of these special array methods are detailed by FIG. 9.27 (3500).

FIG. 9.19 is a flowchart showing the steps taken to transform the byte-code of occurrences of clone method invocations. Initially, at 2702 the replacement byte-code puts in a check to determine if special handling of cloning is required for the object about to be cloned. The execution flow for this check is detailed later by FIG. 9.26 (3400). If special clone support is required as tested by 2704, the execution flow invokes a special method performing the essential steps to ensure that the cloned object will contain the most recent state as shown in 2706. In contrast, if the special handling is not needed the original clone method instruction is executed as depicted by 2708.

FIG. 9.20 is a flowchart showing the replacement of synchronization-related byte-code instructions as defined by 2802. Any synchronization-related instruction will synchronize on a specific object contained on the stack during execution. In step 2804, this object is given as a parameter to a special synchronization method that will return a unique representation of this object that remains unique across possible corresponding objects. Then, when the original byte-code instruction executes, it will synchronize on an object that can later be unlocked by updated classes possibly referring to different corresponding objects.

FIG. 9.21 is a flowchart showing the steps taken to transform field access instructions in the byte-code of update-enabled classes loaded into the virtual machine, 2902. If the instruction is not a GETSTATIC instruction then the transformation process replaces the instruction with a method invocation to the generated field access method as shown by 2914. In case of a GETSTATIC instruction the field owner specified by the byte-code instruction is checked to see if it is an interface in 2906, in which case the original field instruction is preserved. In any other case step 2908 checks if the specified field owner is equal to the class currently being parsed. If this is the case, the process checks if the field is actually declared on the specified class in 2910. If so, the instruction is replaced by an invocation to the generated field access method in step 2914. If not, the transformation process inserts byte-code to perform a runtime check to determine if the declared field owner class has an associated generated access method for this field in step 2912. If the value returned from this method is true, the field access method is invoked as depicted in 2914. On the other hand, if the field access method does not exist on the declared field owner, the original instruction is used to retrieve the field value in step 2916.

FIG. 9.22 is a flowchart showing the steps required to transform the byte-code of field access instructions inside bootstrap classes as well as access from other classes to fields declared in bootstrap classes. In case the instruction is a GETFIELD as tested for in 3002, the transformation inserts the byte-code depicted inside element 3032. Initially, in 3004 the inserted byte-code checks if the owner object for the specific field is update-enabled. If so, the field access is handled in 3006 by invoking a special method to retrieve a boot field in the origin version of the object owner. The execution flow for this boot field delegation is detailed later by FIG. 9.29 (3700). After retrieving an object type value from this special method, step 3008 determines if the field type is primitive, in which case byte-code to unbox the returned object to its primitive counterpart is inserted in 3010. Otherwise, a CHECKCAST instruction is inserted to cast the object to the field type in 3014. Coming back to 3004, in case the object owner is not update-enabled, the inserted byte-code uses the original GETFIELD instruction to safely read the field directly in 3012. In case the original instruction is a PUTFIELD, the initial step of the inserted byte-code shown in 3018 is to manipulate the stack to put the object owner on the stack, thus being able to perform further checks on this object. Then in 3020, the inserted byte-code checks whether the object owner is update-enabled, in which case the field write is delegated to a special method in 3026 after performing the necessary steps to deal with primitive field types in 3022 and 3024. In case the original field instruction is static access to a field, the transformation does not need to insert any byte-code, since these classes cannot be dynamically updated. Hence, the state of static fields is uniquely placed in the declaring bootstrap class.

FIG. 9.23 is a flowchart showing the steps taken to transform field instruction inside system classes. In case the field access is trying to access an instance field as tested for in 3102, the field instruction is replaced by an invocation to the generated associated field access method in step 3104.

FIG. 9.24 is a flowchart showing the steps taken to handle the aforementioned intercepted special methods and operations, 3202. For the execution of one of the transformed occurrences of: 1) object identity comparison, 3204, 2) Class.isInstance method, 3206, 3) CHECKCAST operator, 3208, 4) instanceof operator, 3210, 5) Class.isAssignableFrom method, 3212, the execution layer of the exemplary embodiment of the present invention performs special actions in order to achieve the semantics of the underlying model of the invention as described above. Initially, in step 3214 the execution layer looks up corresponding instances so that both sides of the check or operation comply with the same type namespace in 3214. Then the unmodified version of the original code is performed on these instances in 3216. Coming back to 3212, in case the execution that triggered the execution layer is a Class.getInterfaces method invocation, then the execution layer filters out the special interface added to update-enabled application classes if present in the list of interfaces obtained from the original getInterfaces method in 3218.

FIG. 9.25 is a flowchart showing the steps taken to delegate execution from In-Place Proxy objects to the most recent corresponding version, 3302. In case of a constructor delegation as tested for in 3304, the flow of the execution layer begins at 3306, which is a sanity check to see if the target constructor has been removed from the updated class. If so, constructing falls back to executing the original code in which the delegation process was initiated in 3342. Once the caller object has been constructed from the original constructor, it will become an In-Place Proxy on the first usage of a member of the declaring class and a new un-initialized corresponding target object will be created. In case the target constructor is present in the target class, the parameter values from the original constructor is converted to the type namespace of the target in 3308. Then in step 3310, the target constructor is invoked with the converted parameters, and correspondence relationship between the two corresponding objects are setup in 3312.

In case the incoming delegation request is to a target method as shown by 3314 the execution layer performs a sanity check in 3316 to see if the target method is present in the updated class. If so, the parameters is converted as described before in 3318. Otherwise, it falls back executing the original method in step 3342. Executing the original method. In step 3320 the method is invoked using the converted parameters and if the return type of the method is void as tested in 3322 the process ends. Otherwise, the returned value from the target method is converted back to the corresponding object complying with the type namespace of the caller method in 3324.

In case of a field get execution event, 3326 coming from a generated field read method in an In-Place Proxy the execution layer again starts by performing a sanity check to see if the field and thereby the associated generated field read method is still present in the target class in step 3328. The same check is performed for field write method delegation in step 3336. In case the target method is present the reflective invocation happens in step 3330 and the conversion of the returned field value is done in step 3332. For field write delegation the new field value is first converted to the new target namespace in step 3338 and then the corresponding method is reflectively invoked in step 3340.

FIG. 9.26 is a flowchart showing how the execution layer of the exemplary embodiment handles incoming requests to clone an object or an array, 3402. In case the incoming request is that of an isSpecialCloneNeeded as specified earlier by 2702, the execution layer first checks if the object to clone is update-enabled in step 3406. If not so, this method returns false in step 3412, indicating that no special handling is required to clone the specified object. If the object to clone is update-enabled, step 3408 checks whether the current clone invocation will be carried out by the native clone method declared by the java.lang.Object class. In this case, the method returns true in step 3410 signaling that special handling is needed to clone the object.

In case the incoming request is that of a specialClone method, as tested for in 3414, which is executed only on positive feedback from the above mentioned is SpecialClone method. The execution layer then creates an un-initialized object to become the clone in step 3416. On this newly created object the class hierarchy is traversed in step 3418 copying the field values from the existing object, ensuring that the field value is first located in its current location in any one of its corresponding objects. Hence the clone object will contain the same state as the original object, but none of the meta-information stored in the original object.

In case of array cloning the execution layer first creates a new empty array of the same type of the original array in 3420. Afterwards the corresponding array storing all the current elements of the array is traversed and the values are converted to the type namespace of the new arrays component type in 3422.

FIG. 9.27 is a flowchart showing the steps taken in the execution layer of the exemplary embodiment when a modified occurrence of an array access is executed, 3502. In case the execution event is a query for the length of an array, as tested for in 3504, the execution layer first locates the origin array of the array being queried in step 3506. The origin array is the specific version of an array which was created by application code. The origin array always holds the updated element values in its own type namespace. Then in step 3508, the array length is retrieved from the origin array.

In case of a modified array load operation being executed as checked by 3510 the execution layer retrieves the origin array in 3512, gets the current value from the origin array using the index given in the original AALOAD instruction in step 3514 and converts the value to the type namespace of the caller of the modified byte-code in step 3516.

In case of a modified array store operation being executed the execution layer retrieves the origin array in 3518, converts the value used in the original byte-code instruction to the type namespace of the origin array in 3520, and stores the converted value in the origin array in 3522.

FIG. 9.28 is a flowchart showing the required actions taken to handle the execution of the modified byte-code instructions for retrieving the hash code and the system identity hash code of objects, 3602. In case of executing the replacement byte-code of the system identity hash code checked by 3604, the execution layer retrieves the origin object in 3606, and returns the original identity hash code of the origin object in 3608. In case the modified version of hash code method is invoked, the execution layer in 3610, first checks to see if the specific hash code method used for the current object is that of the method declared in the java.lang.Object class. If so, the flow continues from step 3606 which is already covered. If the hash code method is overridden for the specific object, the request delegates to the most recent corresponding version in step 3612. Hence, asking for the hash code or identity hash code of objects will always return the same result for corresponding objects.

FIG. 9.29 is a flowchart showing the steps taken to delegate a boot field access, 3702. In case of a read boot field delegation request checked by 3704, the execution layer first retrieves the origin object in step 3706. Then it reads the value in the origin object using reflection in step 3708. In case of a boot write field delegation request, the execution layer first retrieves the origin object in step 3710. Then it writes the value given to the origin object using reflection in step 3712.

FIG. 9.30 depicts a flowchart showing the required steps to transfer the state from a former version to the most recent correspondent version of an object, 3802. In step 3804, the execution layer initially looks up all objects corresponding to the object that triggered the state transfer. The list of corresponding objects located is stored in a variable named previousObjects. This list is then traversed by assigning the next element to a variable named previous in step 3806. Then in

3808 the execution layer determines if the current element (previous) holds on to the current version of the state, in which case the value in the located version is converted to the type namespace of the most recent corresponding object in step 3810. Furthermore, the converted field is written to the field in the most recent corresponding version. Afterwards the associated Boolean value to specify the presence of state of individual field values is set for the most recent corresponding object in step 3812, and cleared for the old field value owner in step 3814. Coming back to 3808 in case the current field value is not present in the current element traversed the list of corresponding objects is checked again to see if there are more elements to traverse in step 3816. If so the flow recursively returns to step 3806. In case no more elements are found the execution layer concludes that the specific field must be newly declared in the most recent version of the class in step 3818. Thus, the field value contains the value assigned to it by the algorithm described earlier to assign default values to newly declared fields.

Finally, FIG. 9.31 is a flowchart depicting the steps taken to clear the field value in a previous corresponding object when a first time field-write in the most recent version altered the associated Boolean value, 3902. In step 3904, the execution layer initially looks up all objects corresponding to the object that triggered the execution of the state clearing, again stored as previousObjects. This list is traversed by assigning the next element to a variable named previous in step 3906. If the current element holds the state as specified by the associated Boolean value, checked in 3908, the value as well as the Boolean field is cleared for the specific element traversed in step 3910 and the process ends. In case the previous element does not hold the state, the next element is searched if such an element exists as tested for in 3912. In case all elements have been traversed and the state is not found in any one of them, the execution layer falls through in step 3914 as the field is new and therefore the field value is already placed uniquely in one corresponding object only.

References

[1] Sato Y., Chiba S.: Loosely-separated "Sister" Namespaces in Java. In proceedings of ECOOP'05. Lecture Notes in Computer Science, Vol. 3586. Springer-Verlag, (2005) pp. 49-70.

[2] Drossopoulou, S., Wragg, D., and Eisenbach, S. 1998. What is Java binary Compatibility?. In Proceedings of OOPSLA'98. ACM press 1998, pp. 341-361.

[3] Orso A., Rao A., Harrold M. J.: A Technique for Dynamic Updating of Java Software. In: proceedings of ICSM'02, IEEE Computer Society 2002, pp. 649-658.

[4] Büchi M., Weck W.: Generic Wrappers. In proceedings of ECOOP 2000. Lecture Notes in Computer Science, Vol. 1850. Springer-Verlag, (2000) pp. 201-225.

[5] Dmitriev M.: Safe Evolution of Large and Long-Lived Java Applications. PhD thesis, Department of Computing Science, University of Glasgow, Glasgow G12 8QQ, Scotland, 2001.

[6] Malabarba S., Pandey R., Gragg J., Barr E., and Barnes F.: Runtime Support for Type-Safe Dynamic Java Classes. In Proceedings of ECOOP'00. Lecture Notes in Computer Science, Vol. 1850. Springer-Verlag, (2000) pp. 337-361.

[7] Subramanian S., Hicks M., McKinley K.: Dynamic Software Updates: A VM-centric Approach. In Proceedings of the 2009 ACM SIGPLAN conference on Programming language design and implementation, ACM SIGPLAN Notices, Volume 44, Issue 6, May 2009, pp. 1-12

[8] Gustavson, J.: Dynamic Updating of Computer Programs—Proposed Improvements to the JDrums Updating System, Rise publications 2005.

[9] Bialek, R., Jul, E., J.-G. Schneider, J.-G., Jin, Y.: Partitioning of Java applications to support dynamic updates. In proceedings of APSEC'04, IEEE Computer Society Press, pp. 616-623.

[10] Hjalmtysson G., Gray R.: Dynamic C++ classes. In Proceedings of the USENIX 1998 Annual Technical Conference, pages 65-76. USENIX Association, Jun. 15-19, 1998.

[11] Stanek J., Kothari S., Nguyen T. N., Cruz-Neira C. 2006. Online Software Maintenance for Mission-Critical Systems. In Proceedings of ICSM'06, IEEE Computer Society 2006, pp. 93-103.

[12] Chen H., Yu J., Chen R., Zang B., Yew P.: POLUS: A POwerful Live Updating System. In Proceedings ICSE'07, IEEE Computer Society 2007, pp. 271-281.

The invention claimed is:

1. A method for transparent runtime switching of live objects of a previous version of a class, as present in an actively running computer system, into surrogate objects for corresponding objects of a new version of the class that has been dynamically loaded after the live objects were instantiated from a previous version of the class, wherein, object identity and class type assignability are shared between the surrogate objects and their co-existing live objects of the previous version of the class, the method comprising:

providing a software update, wherein the software update comprises byte-code for a change set of class definitions that constitute the difference between the previous version of the class in the actively running computer system and the new version of the class;

performing a non-blocking software update of the actively running computer system by transparently switching behavior of the currently live objects instantiated from the class in the change set to become un-initialized surrogates for future on-demand instantiated corresponding objects of a new class definition;

performing pre-boot transformations of Virtual Machine specific bootstrap classes, to prepare the bootstrap classes for future updates to application sub-classes of the bootstrap classes, by injecting byte-code into the bootstrap classes so that extended and/or overridden behavior, as defined by updated subclasses, are effectuated for already instantiated objects of former versions of the bootstrap classes;

executing an application instance in which the transformed bootstrap classes constitute a new set of Virtual Machine bootstrap classes for the application instance;

intercepting loading of byte-code of the class loaded into the Virtual Machine and once the class loading is initiated, in successive phases, transforming the byte-code of the class to enable shared object identity and class type identity for correspondent co-existent objects and the class;

between alternatives: transforming a system class definition on-demand, to prepare the system class for future updates of application sub-classes of the system class, by injecting byte-code into the system class so that extended and/or overridden behavior, as defined by updated subclasses, are effectuated for already instantiated objects of former versions of the updated subclasses; and transforming an application class to make it update-enabled by injecting byte-code into the application class itself enabling run-time switching of the application class and instances hereof to become a surrogate class for future corresponding objects of the application class, to which the identity and state are automatically transferred in a non-blocking fashion.

2. The method of claim 1 wherein the object identity and state of the live objects are paired on first usage after a dynamic software update to the corresponding objects of the new version of the class, comprising:
   constructing un-initialized corresponding objects of the new class version;
   constructing unique identity id's for the corresponding objects, ensuring that future enhanced identity checks yield true for the corresponding objects regardless of their specific version; and
   migrating the state from the live objects on first usage after the dynamic software update.

3. The method of claim 2 wherein the un-initialized corresponding objects automatically initialize a part of an object state, which is new to the surrogate objects comprising:
   Inserting a generated byte-code method into the application class that initializes the part of the object state that is new to the surrogate objects that triggered the construction of the un-initialized corresponding objects.

4. The method of claim 1 wherein different versions of the class can co-exist, comprising:
   loading the different versions of the class with a separate class loader, thus enabling multiple types representing the class to be loaded into the virtual machine; and
   replacing byte-code in the class that performs dynamic class type operations as defined by a language, by byte-code that performs dynamic class type checks, in which operands of the dynamic class type check operations are replaced by corresponding versions that share a same type namespace.

5. The method of claim 1 wherein forwarding of method calls of the previous version of the class transforms the live objects into the surrogate objects, which forward access of its members to the corresponding objects of the new version of the class, comprising:
   Transforming the byte-code of the class ensuring that a client referencing any one of the corresponding objects of the new version of the class will always see an object with a type assignable from reachable types of its own class loader comprising:
   replacing the virtual machine's byte-code instruction 'instanceof' by byte-code that performs an 'instanceof' check on a specific corresponding object representation that complies with a type namespace of a right hand side operand of the 'instanceof' instruction;
   replacing the virtual machine's byte-code instruction equivalent for 'CHECKCAST' by byte-code that performs the 'CHECKCAST' instruction on the specific corresponding object representation that complies with a type namespace of a right hand side operand of the 'CHECKCAST' instruction; and
   runtime switching of the live objects of the previously loaded version of the class into the surrogates that will redirect any future request to the corresponding objects of the new version of the class, wherein a possible value obtained from a new corresponding representation is replaced by a surrogate representation that complies to a type namespace of a caller of a surrogate member, and wherein inserted byte-code for controlling the redirect process replaces parameters given by the caller of the surrogate member by the corresponding representation that complies with a type namespace of a receiver of the redirect process.

6. The method of claim 5 wherein caching of the virtual machine's representation of the method calls from the surrogate objects to the corresponding objects of the new version of the class enables efficient forwarding.

7. The method of claim 1 wherein the object identity is shared between the live objects of different versions of the class, comprising:
   transforming the byte-code of the class to enable the shared object identity, wherein the virtual machine's byte-code instruction to compare objects for identity is replaced by byte-code that performs the identity comparison using the corresponding objects of the different versions of the class belonging to a same type namespace.

8. The method of claim 1 wherein the state is shared between the live objects instantiated from different versions of the class, comprising:
   bookkeeping of which object version in a set of corresponding objects representing the same object holds individual shared field values at present;
   generating byte-code in system classes that wraps field-accesses in one generated get method per declared instance field and one generated set method per declared instance field, wherein the algorithm inserted into the get method comprises:
   Ensuring that when invoked on the surrogate objects, the field read request delegates to a corresponding object initially created from a standard constructor;
   and wherein an algorithm inserted into the set method comprises:
   Ensuring that when invoked on the surrogate objects, the field read request delegates to corresponding object initially created from the standard constructor;
   generating byte-code in the bootstrap classes that replaces byte-code instructions to access instance fields with a reflective invocation to access a field in the corresponding object initially created from the standard constructor;
   generating byte-code in the application class that wraps field-accesses in one generated get method per declared field and one generated set method per declared field, wherein the algorithm inserted into the get method comprises:
   ensuring that when invoked on the surrogate objects the field read request forwards to the most recent corresponding version of the surrogate object wherein the field value obtained from the most recent corresponding object is converted to that of a type namespace of the surrogate object;
   ensuring that if the field value is not currently present in the most recent corresponding object the field value is searched for in the corresponding objects and transferred by first converting it to the type namespace of the most recent corresponding object;
   ensuring that if the field value is present in the most recent corresponding object the field value is read and returned if there has been no update in the meantime;
   ensuring that if an update of the class declaring the generated field get method happens after the field value has been read, it forwards the read request to the most recent corresponding version of the surrogate object wherein the field value obtained from the most recent corresponding object is converted to that of the type namespace of the now surrogate object;
   and wherein an algorithm inserted into the set method comprises:
   ensuring that when invoked on the surrogate objects, the field write request forwards to the most recent corresponding version of the surrogate object wherein the field value forwarded to the most recent corresponding object is converted to that of the type namespace of the most recent corresponding object;

ensuring that if the field value is not currently present in the most recent corresponding object the field value is written and the corresponding object that previously held the field value is found and asked to clear the previous state;

ensuring that if the field value is present in the most recent corresponding object the field value is written if there has been no update in the meantime; and ensuring that if an update of the class declaring the generated field set method happens after the field value has been written, it forwards the read request to the most recent corresponding version of the surrogate object wherein the field value forwarded to the most recent corresponding object is converted to that of the type namespace of the most recent corresponding object.

9. The method of claim 8 wherein a transfer of state from an object of a previous version of the class to the most recent corresponding object executes under a temporary locking mechanism shared by corresponding objects.

10. The method of claim 8 wherein the clearing of state in a previous corresponding version executes under a temporary locking mechanism shared by corresponding objects.

11. The method of claim 1 wherein a common synchronization object ensures synchronized access for threads to an object and its group of surrogate objects, comprising:
transforming the byte-code of classes comprising:
replacing the built-in synchronization access modifier by byte-code that inserts a MONITORENTER equivalent instruction at the beginning of methods and MONITOREXIT equivalent instructions on every exit point of methods including those exit points occurring due to an uncaught exception in an original method body, wherein the object being synchronized is identical for corresponding objects; and
replacing operations that perform synchronization as defined by a language by byte-code that exchanges the object being synchronized by a uniquely identifiable object that is identical for corresponding objects.

12. The method of claim 1 wherein an object becomes a surrogate object by forwarding all access to its members to a corresponding object of a newest version of the class comprising:
Inserting byte-code at the beginning of each method in the application class ensuring that the surrogate object automatically adapts its forwarding to the corresponding object instantiated from the newest version of the class.

13. The method of claim 12 wherein access to an object is forwarded by replacing definitions of method bodies at runtime.

14. The method of claim 1 wherein the live object is dynamically switched into the surrogate object without blocking any thread currently executing code within the live object during the switch.

15. The method of claim 1 wherein the surrogate objects share state and identity, with an on-demand constructed correspondent object instantiated from a newest version of the class.

16. The method of claim 1 wherein the surrogate objects share state with an on-demand constructed correspondent object instantiated from a newest version of the class.

17. The method of claim 1 wherein the surrogate object objects share identity with an on-demand constructed correspondent object instantiated from a newest version of the class.

18. The method of claim 1 wherein clients of the surrogate objects hold one or more references to the type of the class of the surrogate objects, but use method bodies of a newest version of the class through the forwarding of surrogate members to the newest correspondent class version.

19. The method of claim 1 wherein the byte-code transformation of the class replaces all reflective mechanisms to read object state directly by byte-code that invokes an associated generated get method in a declaring class.

20. The method of claim 1 wherein the byte-code transformation of the class replaces all reflective mechanisms to write object state directly by byte-code that invokes an associated generated set method in a declaring class.

21. The method of claim 1 wherein the byte-code transformations of the application class inserts byte-code at the beginning of a class initialize method to ensure that original code in the class initialize method is not executed in case a former version of the application class has previously been loaded into the virtual machine.

22. The method of claim 1 wherein the byte-code transformations of the class inserts byte-code at the beginning of object constructors to ensure that the constructors neither executes their original code nor redirect the constructor invocation to the corresponding object of the newest version of the class, if the construction happens on a surrogate instance of a sub class of a declaring constructor.

23. The method of claim 1 wherein the byte-code transformations of the class inserts byte-code at the beginning of object finalizers to ensure that the finalizers neither execute their original code nor redirect the finalize invocation to the newest corresponding object if the finalization happens on a surrogate instance.

24. The method of claim 1 wherein the byte-code transformations of the class replaces occurrences of cloning as defined by a language by byte-code that ensures that a created clone contains state equivalent to that of a state shared by all corresponding objects of the object being cloned.

25. The method of claim 1 wherein the byte-code transformations of the class replaces occurrences of object serialization by byte-code that replaces the object to be serialized by the most recent corresponding object wherein the inserted byte-code ensures that the shared object state is transferred to the most recent corresponding object before continuing the serialization process.

26. The method of claim 1 wherein the byte-code transformations of the class replaces instructions to access arrays by byte-code that redirects the access request to a most recent corresponding array object, comprising:
converting a value obtained by a replaced array read operation to that of a caller class' type namespace; and
converting the value to use in a replaced array write operation to that of the most recent corresponding array object type namespace.

27. The method as recited in claim 1 wherein type information of the new version of the class that has been dynamically loaded, indicates an inheritance hierarchy that is different from that of previous loaded versions of the class.

28. The method as recited in claim 1 wherein type information for the new version of the class that has been dynamically loaded, indicates a different interface than the ones of previous loaded versions of the class.

29. The method as recited in claim 1 wherein method declarations in the new version of the class that has been dynamically loaded, are different from those in previous loaded versions of the class.

30. The method as recited in claim 1 wherein field declarations in the new version of the class that has been dynamically loaded, are different from those in previous loaded versions of the class.

31. The method of claim 1 wherein the classes are statically type checked during compilation.

32. The method of claim 1 wherein classes are represented by byte-code.

33. The method of claim 1 wherein starting the Virtual Machine without providing an alternative boot-class path initiates static byte-code transformation of the bootstrap classes, comprising:
    transforming the byte-code of already loaded bootstrap classes;
    storing resulting modified bootstrap classes on an alternative boot-class path; and
    abandoning any further execution of program code upon completion of the byte-code transformation, effectively bringing the computer program to an end.

34. The method of claim 1 wherein starting the Virtual Machine with an alternative boot-class path initiates booting of the Virtual Machine with an alternative set of bootstrap classes.

35. The method of claim 1 wherein starting the Virtual Machine without providing an alternative boot-class path initiates dynamic byte-code transformation of the bootstrap classes, comprising:
    transforming the byte-code of already loaded bootstrap classes;
    storing resulting modified bootstrap classes on an alternative boot-class path;
    intercepting loading of byte-code for all non-bootstrap classes declaring the Virtual Machine's special program startup method to insert byte-code for intercepting program input arguments handed to the special program startup method;
    starting a new Virtual Machine instance providing it any program input arguments, and optional Virtual Machine arguments including the alternative boot-class path; and
    waiting for the new Virtual Machine instance to terminate and once awoken abandoning any further execution of program code effectively bringing the computer program to an end.

36. A computer program product comprising:
    a non-transitory computer usable medium;
    computer readable instructions embodied on said non-transitory computer useable medium for dynamically refreshing software modules within an actively running computer system, the instructions directing a computer to perform the steps of claim 1.

37. A system implemented in a computer for enabling non-blocking dynamic update of actively running computer software written in a statically-typed class-based object-oriented programming language wherein classes are represented by byte-code, comprising means for performing the steps of claim 1.

* * * * *

UNITED STATES PATENT AND TRADEMARK OFFICE
CERTIFICATE OF CORRECTION

PATENT NO. : 8,707,287 B2
APPLICATION NO. : 13/130524
DATED : April 22, 2014
INVENTOR(S) : Allan Raundahl Gregersen et al.

It is certified that error appears in the above-identified patent and that said Letters Patent is hereby corrected as shown below:

In the Claims

In Claim 17, column 33, line 62, delete the word "object".

Signed and Sealed this
Twenty-ninth Day of July, 2014

Michelle K. Lee
*Deputy Director of the United States Patent and Trademark Office*